United States Patent
Deshpande

(10) Patent No.: US 10,848,735 B2
(45) Date of Patent: Nov. 24, 2020

(54) SYSTEMS AND METHODS FOR SIGNALING INFORMATION ASSOCIATED WITH CONSTITUENT PICTURES IN VIRTUAL REALITY APPLICATIONS

(71) Applicant: SHARP KABUSHIKI KAISHA, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/627,085

(22) PCT Filed: Jun. 26, 2018

(86) PCT No.: PCT/JP2018/024212
§ 371 (c)(1),
(2) Date: Dec. 27, 2019

(87) PCT Pub. No.: WO2019/004219
PCT Pub. Date: Jan. 3, 2019

(65) Prior Publication Data
US 2020/0228776 A1 Jul. 16, 2020

Related U.S. Application Data

(60) Provisional application No. 62/533,228, filed on Jul. 17, 2017, provisional application No. 62/527,141, filed on Jun. 30, 2017.

(51) Int. Cl.
*H04N 13/161* (2018.01)
*H04N 19/174* (2014.01)
*H04N 19/176* (2014.01)

(52) U.S. Cl.
CPC ......... *H04N 13/161* (2018.05); *H04N 19/174* (2014.11); *H04N 19/176* (2014.11)

(58) Field of Classification Search
CPC combination set(s) only.
See application file for complete search history.

(56) References Cited

U.S. PATENT DOCUMENTS

2019/0387212 A1* 12/2019 Oh .................... G06T 3/0031

OTHER PUBLICATIONS

Sejin Oh, Hyunmook Oh:"SEI message for signaling of 360-degree video information"[online]; JCTVC-Z0026; Joint Collaborative Team on Video Coding (JCT-VC) of ITU-T SG 16 WP 3 and ISO/IEC JTC 1/SC 29/WG 11 26th Meeting: Geneva, CH, Jan. 12-20, 2017.

* cited by examiner

*Primary Examiner* — Janese Duley
(74) *Attorney, Agent, or Firm* — ScienBiziP, P.C.

(57) ABSTRACT

A device may be configured to signal information associated with constituent pictures according to one or more of the techniques described herein.

2 Claims, 8 Drawing Sheets

SYSTEMS AND METHODS FOR SIGNALING INFORMATION ASSOCIATED WITH CONSTITUENT PICTURES IN VIRTUAL REALITY APPLICATIONS

CROSS REFERENCE

This Nonprovisional application claims priority under 35 U.S.C. § 119 on provisional Application No. 62/527,141 on Jun. 30, 2017, No. 62/533,228 on Jul. 17, 2017, the entire contents of which are hereby incorporated by reference.

TECHNICAL FIELD

This disclosure relates to interactive video distribution and more particularly to techniques for signaling information associated with constituent pictures.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be delivered over packet-switched networks, including bidirectional networks, such as Internet Protocol (IP) networks and unidirectional networks, such as digital broadcast networks.

Digital video included in digital media content may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Prediction coding techniques may be used to generate difference values between a unit of video data to be coded and a reference unit of video data. The difference values may be referred to as residual data. Residual data may be coded as quantized transform coefficients. Syntax elements may relate residual data and a reference coding unit. Residual data and syntax elements may be included in a compliant bitstream. Compliant bitstreams and associated metadata may be formatted according to data structures. Compliant bitstreams and associated metadata may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 suite of standards.

SUMMARY OF INVENTION

In one example, a method for signaling information associated with projected pictures that are packed region-wise, comprises signaling information associated with a projected picture and signaling a syntax element indicating whether the information applies individually to each constituent picture.

In one example, a method of determining information associated with projected pictures that are packed region-wise comprises receiving information associated with a projected picture and parsing a syntax element indicating whether the information applies individually to each constituent picture.

DESCRIPTION OF EMBODIMENTS

Figure 1:
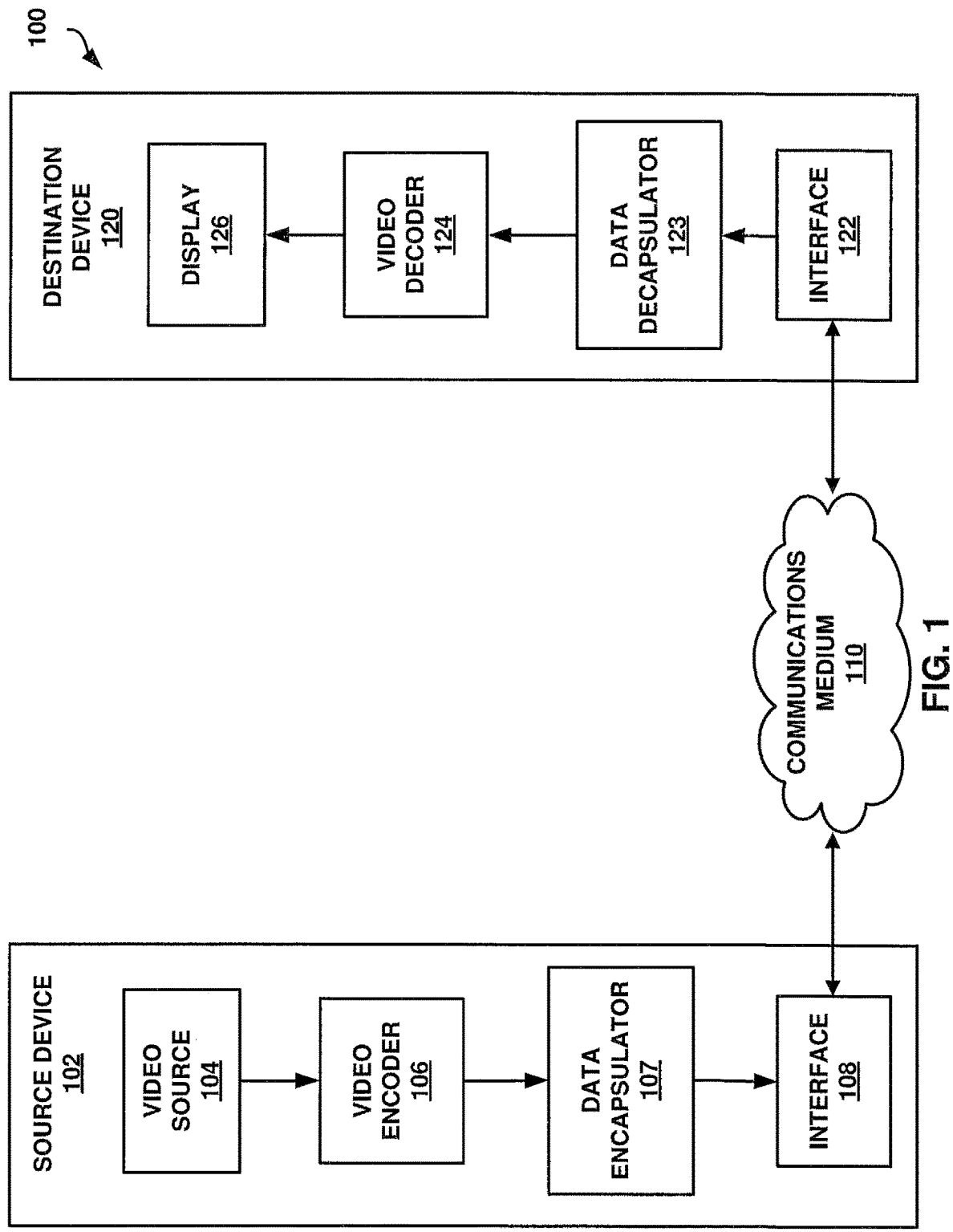
FIG. 1 is a block diagram illustrating an example of a system that may be configured to transmit coded video data according to one or more techniques of this disclosure.

In general, this disclosure describes various techniques for coding video data. In particular, this disclosure describes techniques for signaling information associated with constituent pictures. It should be noted that although techniques of this disclosure are described with respect to ITU-T H.264 and ITU-T H.265, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264 and ITU-T H.265 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device comprises one or more processors configured to signal information associated with a projected picture and signal a syntax element indicating whether the information applies individually to each constituent picture.

In one example, a device comprises one or more processors configured to determine information associated with projected pictures that are packed region-wise comprises receiving information associated with a projected picture and parse a syntax element indicating whether the information applies individually to each constituent picture.

In one example, a non-transitory computer-readable storage medium comprises instructions stored thereon that, when executed, cause one or more processors of a device to signal information associated with a projected picture and signal a syntax element indicating whether the information applies individually to each constituent picture.

In one example, a non-transitory computer-readable storage medium comprises instructions stored thereon that, when executed, cause one or more processors of a device to determine information associated with projected pictures that are packed region-wise comprises receiving information associated with a projected picture and parse a syntax element indicating whether the information applies individually to each constituent picture.

In one example, an apparatus comprises means for signaling information associated with a projected picture and means for signaling a syntax element indicating whether the information applies individually to each constituent picture.

In one example, an apparatus comprises means for receiving information associated with a projected picture and means for parsing a syntax element indicating whether the information applies individually to each constituent picture.

The details of one or more examples are set forth in the accompanying drawings and the description below. Other features, objects, and advantages will be apparent from the description and drawings, and from the claims.

Video content typically includes video sequences comprised of a series of frames. A series of frames may also be referred to as a group of pictures (GOP). Each video frame or picture may include a one or more slices, where a slice includes a plurality of video blocks. A video block may be defined as the largest array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. As used herein, the term video block may generally refer to an area of a picture or may more specifically refer to the largest array of pixel values that may be predictively coded, sub-divisions thereof, and/or corresponding coding parameters and/or structures. Further, according to ITU-T H.265, each video frame or picture may be partitioned to include one or more tiles, where a tile is a sequence of coding tree units corresponding to a rectangular area of a picture.

In ITU-T H.265, the CTBs of a CTU may be partitioned into Coding Blocks (CB) according to a corresponding quadtree block structure. According to ITU-T H.265, one luma CB together with two corresponding chroma CBs and associated syntax elements are referred to as a coding unit (CU). A CU is associated with a prediction unit (PU) structure defining one or more prediction units (PU) for the CU, where a PU is associated with corresponding reference samples. That is, in ITU-T H.265 the decision to code a picture area using intra prediction or inter prediction is made at the CU level and for a CU one or more predictions corresponding to intra prediction or inter prediction may be used to generate reference samples for CBs of the CU. In ITU-T H.265, a PU may include luma and chroma prediction blocks (PBs), where square PBs are supported for intra prediction and rectangular PBs are supported for inter prediction. Intra prediction data (e.g., intra prediction mode syntax elements) or inter prediction data (e.g., motion data syntax elements) may associate PUs with corresponding reference samples. Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

Virtual Reality (VR) applications may include video content that may be rendered with a head-mounted display, where only the area of the spherical video that corresponds to the orientation of the user's head is rendered. VR applications may be enabled by omnidirectional video, which is also referred to as 360 degree spherical video or 360 degree video. Omnidirectional video is typically captured by multiple cameras that cover up to 360 degrees of a scene. A distinct feature of omnidirectional video compared to normal video is that, typically only a subset of the entire captured video region is displayed, i.e., the area corresponding to the current user's field of view (FOV) is displayed. A FOV is sometimes also referred to as viewport. In other cases, a viewport may be part of the spherical video that is currently displayed and viewed by the user. It should be noted that the size of the viewport can be smaller than or equal to the field of view. Further, it should be noted that omnidirectional video may be captured using monoscopic or stereoscopic cameras. Monoscopic cameras may include cameras that capture a single view of an object. Stereoscopic cameras may include cameras that capture multiple views of the same object (e.g., views are captured using two lenses at slightly different angles). Further, it should be noted that in some cases, images for use in omnidirectional video applications may be captured using ultra wide-angle lens (i.e., so-called fisheye lens). In any case, the process for creating 360 degree spherical video may be generally described as stitching together input images and projecting the stitched together input images onto a three-dimensional structure (e.g., a sphere or cube), which may result in so-called projected frames. Further, in some cases, regions of projected frames may be transformed, resized, and relocated, which may result in a so-called packed frame.

A region in an omnidirectional video picture may refer to a subset of the entire video region. It should be noted that regions of an omnidirectional video may be determined by the intent of a director or producer, or derived from user statistics by a service or content provider (e.g., through the statistics of which regions have been requested/seen by the most users when the omnidirectional video content was provided through a streaming service). For example, for an omnidirectional video capturing a sporting event, a region may be defined for a view including the center of the playing field and other regions may be defined for views of the stands in a stadium. Regions may be used for data pre-fetching in omnidirectional video adaptive streaming by edge servers or clients, and/or transcoding optimization when an omnidirectional video is transcoded, e.g., to a different codec or projection mapping. Thus, signaling regions in an omnidirectional video picture may improve system performance by lowering transmission bandwidth and lowering decoding complexity.

Choi et al., ISO/IEC JTC1/SC29/WG11 M40849, "OMAF DIS text with updates based on Berlin OMAF AHG meeting agreements," July 2017, Torino, IT, which is incorporated by reference and herein referred to as Choi, defines a media application format that enables omnidirectional media applications. Choi specifies a list of projection techniques that can be used for conversion of a spherical or 360 degree video into a two-dimensional rectangular video; how to store omnidirectional media and the associated metadata using the International Organization for Standardization (ISO) base media file format (ISOBMFF); how to encapsulate, signal, and stream omnidirectional media using dynamic adaptive streaming over Hypertext Transfer Protocol (HTTP) (DASH); and which video and audio coding standards, as well as media coding configurations, may be used for compression and playback of the omnidirectional media signal.

Figure 2A:
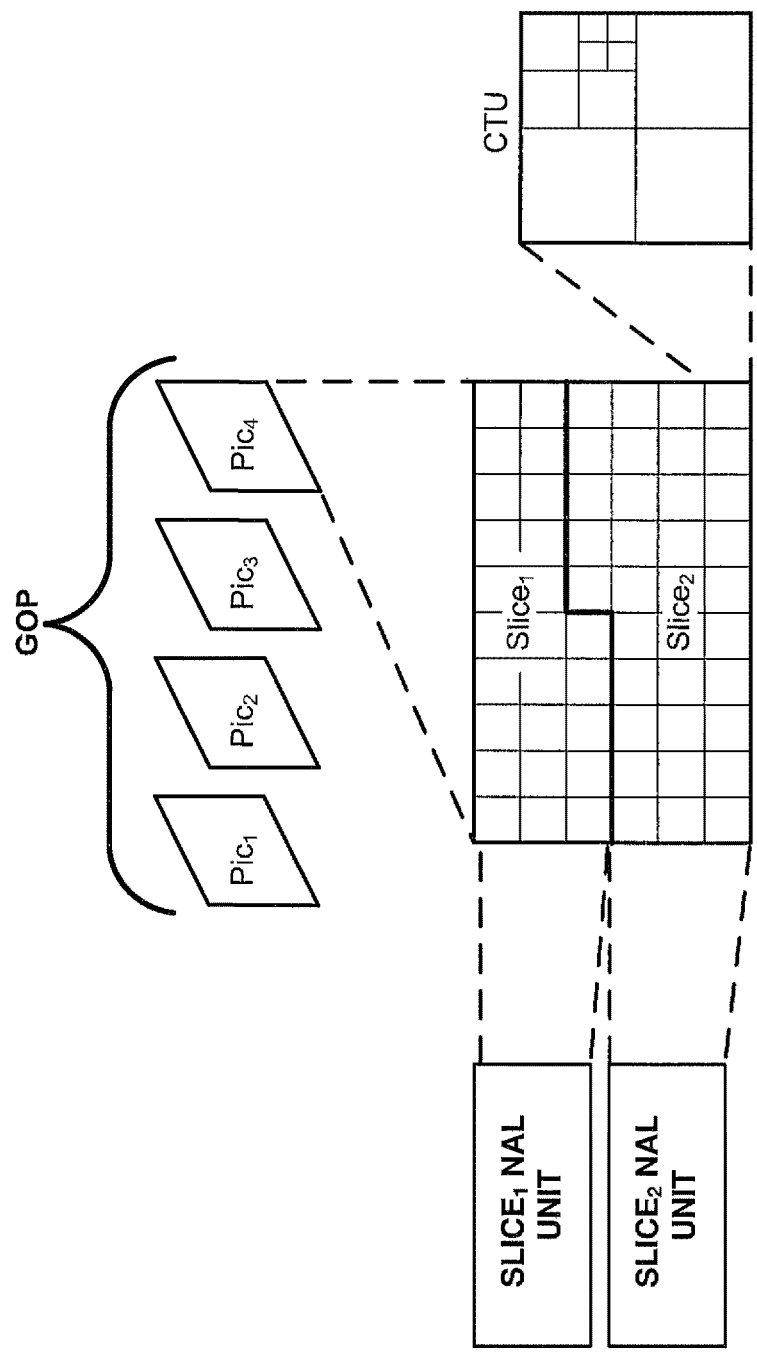
FIG. 2A is a conceptual diagram illustrating coded video data and corresponding data structures according to one or more techniques of this disclosure.
Figure 2B:
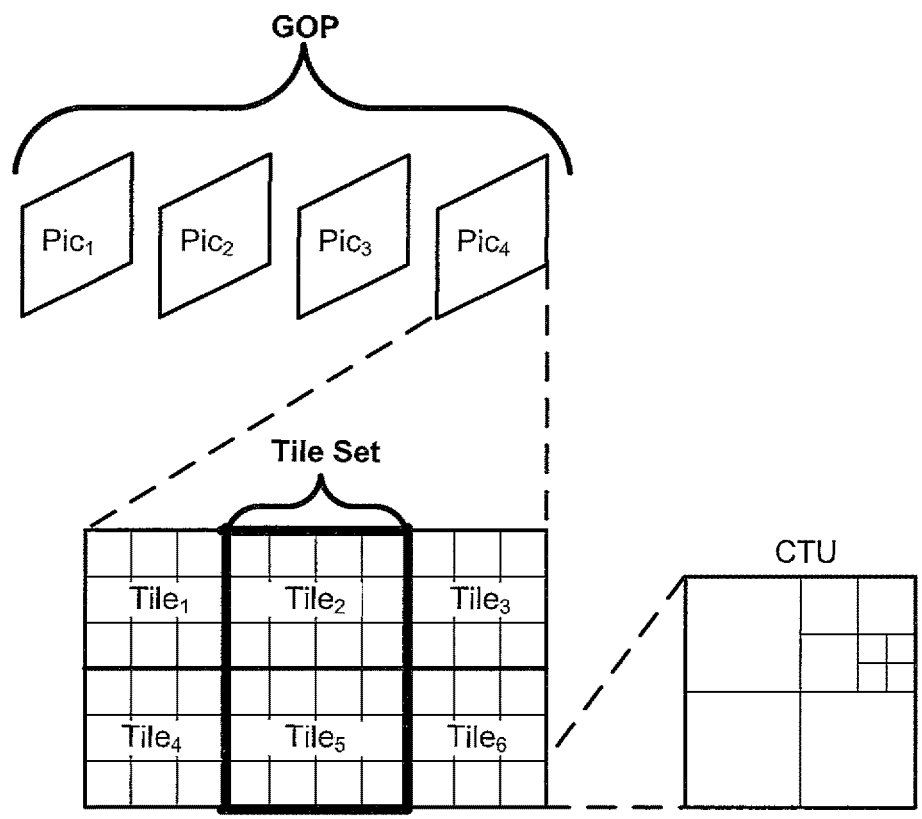
FIG. 2B is a conceptual diagram illustrating coded video data and corresponding data structures according to one or more techniques of this disclosure.

As described above, according to ITU-T H.265, each video frame or picture may be partitioned to include one or more slices and further partitioned to include one or more tiles. FIGS. 2A-2B are conceptual diagrams illustrating an example of a group of pictures including slices and further partitioning pictures into tiles. In the example illustrated in FIG. 2A, $Pic_4$ is illustrated as including two slices (i.e., $Slice_1$ and $Slice_2$) where each slice includes a sequence of CTUs (e.g., in raster scan order). In the example illustrated in FIG. 2B, $Pic_4$ is illustrated as including six tiles (i.e., $Tile_1$ to $Tile_6$), where each tile is rectangular and includes a sequence of CTUs. It should be noted that in ITU-T H.265, a tile may consist of coding tree units contained in more than one slice and a slice may consist of coding tree units contained in more than one tile. However, ITU-T H.265 provides that one or both of the following conditions shall be fulfilled: (1) All coding tree units in a slice belong to the same tile; and (2) All coding tree units in a tile belong to the same slice. Thus, with respect to FIG. 2B, each of the tiles may belong to a respective slice (e.g., $Tile_1$ to $Tile_6$ may respectively belong to slices, $Slice_1$ to $Slice_6$) or multiple tiles may belong to a slice (e.g., $Tile_1$ to $Tile_3$ may belong to $Slice_1$ and $Tile_4$ to $Tile_6$ may belong to $Slice_2$).

Further, as illustrated in FIG. 2B, tiles may form tile sets (i.e., $Tile_2$ and $Tile_5$ form a tile set). Tile sets may be used to define boundaries for coding dependencies (e.g., intra-prediction dependencies, entropy encoding dependencies, etc.) and as such, may enable parallelism in coding. For example, if the video sequence in the example illustrated in FIG. 2B corresponds to a nightly news program, the tile set formed by $Tile_2$ and $Tile_5$ may correspond to a visual region including a news anchor reading the news. ITU-T H.265 defines signaling that enables motion-constrained tile sets (MCTS). A motion-constrained tile set may include a tile set for which inter-picture prediction dependencies are limited to the collocated tile sets in reference pictures. Thus, it is possible to perform motion compensation for a given MCTS independent of the decoding of other tile sets outside the MCTS. For example, referring to FIG. 2B, if the tile set formed by $Tile_2$ and $Tile_5$ is a MCTS and each of $Pic_1$ to $Pic_3$ include collocated tile sets, motion compensation may be performed on $Tile_2$ and $Tile_5$ independent of coding $Tile_1$, $Tile_3$, $Tile_4$, and $Tile_6$ in $Pic_4$ and tiles collocated with tiles $Tile_1$, $Tile_3$, $Tile_4$, and $Tile_6$ in each of $Pic_1$ to $Pic_3$. Coding video data according to MCTS may be useful for video applications including omnidirectional video presentations.

Figure 3:
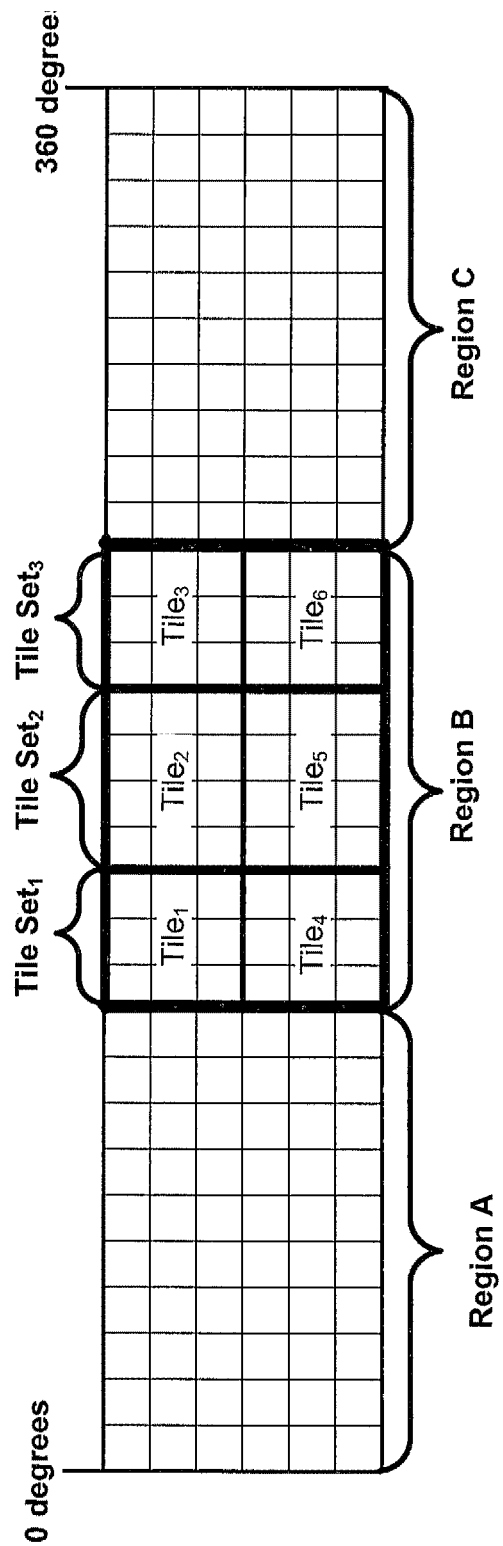
FIG. 3 is a conceptual diagram illustrating coded video data and corresponding data structures according to one or more techniques of this disclosure.

As illustrated in FIG. 3, tiles (i.e., $Tile_1$ to $Tile_6$) may form a region of an omnidirectional video. Further, the tile set formed by $Tile_2$ and $Tile_5$ may be a MCTS included within the region. Viewport dependent video coding, which may also be referred to as viewport dependent partial video coding, may be used to enable coding of only part of an entire video region. That is, for example, view port dependent video coding may be used to provide sufficient information for rendering of a current FOV. For example, omnidirectional video may be coded using MCTS, such that each potential region covering a viewport can be independently coded from other regions across time. In this case, for example, for a particular current viewport, a minimum set of tiles that cover a viewport may be sent to the client, decoded, and/or rendered. This process may be referred to as simple tile based partial decoding (STPD).

Referring again to FIG. 3, as illustrated in FIG. 3, the 360 degree video includes Region A, Region B, and Region C. In the example illustrated in FIG. 3, each of the regions are illustrated as including CTUs. As described above, CTUs may form slices of coded video data and/or tiles of video data. Further, as described above, video coding techniques may code areas of a picture according to video blocks, sub-divisions thereof, and/or corresponding structures and it should be noted that video coding techniques enable video coding parameters to be adjusted at various levels of a video coding structure, e.g., adjusted for slices, tiles, video blocks, and/or at sub-divisions. Referring again to FIG. 3, in one example, the 360 degree video illustrated in FIG. 3 may represent a sporting event where Region A and Region C include views of the stands of a stadium and Regions B includes a view of the playing field (e.g., the video is captured by a 360 degree camera placed at the 50-yard line).

It should be noted that regions of omnidirectional video may include regions on a sphere. Choi describes where a region on a sphere may be specified by four great circles, where a great circle (also referred to as a Riemannian circle) is an intersection of the sphere and a plane that passes through the center point of the sphere, where the center of the sphere and the center of a great circle are co-located. Choi further describes where a region on a sphere may be specified by two yaw circles and two pitch circles, where a yaw circle is a circle on the sphere connecting all points with the same yaw value, and pitch circle is a circle on the sphere connecting all points with the same pitch value.

As described above, Choi specifies a list of projection techniques that can be used for conversion of a spherical or 360 degree video into a two-dimensional rectangular video. Choi specifies where a projected frame is a frame that has a representation format by a 360 degree video projection indicator and where a projection is the process by which a set of input images are projected onto a projected frame. Further, Choi specifies where a projection structure includes a three-dimensional structure including one or more surfaces on which the captured image/video content is projected, and from which a respective projected frame can be formed. Finally, Choi provides where a region-wise packing includes a region-wise transformation, resizing, and relocating of a projected frame and where a packed frame is a frame that results from region-wise packing of a projected frame. Thus, in Choi, the process for creating 360 degree spherical video may be described as including image stitching, projection, and region-wise packing. It should be noted that Choi specifies a coordinate system, omnidirectional projection formats, including an equirectangular projection, a rectangular region-wise packing format, and an omnidirectional fisheye video format, for the sake of brevity, a complete description of all of these sections of Choi is not provided herein. However, reference is made to the relevant sections of Choi.

With respect to projection structure and coordinate system, Choi provides where the projection structure is a unit sphere, the coordinate system can be used for example to indicate the orientation of the projection structure or a spherical location of a point, and the coordinate axes used for defining yaw ($\phi$), pitch ($\theta$), and roll angles, where yaw rotates around the Y (vertical, up) axis, pitch around the x (lateral, side-to-side) axis, and roll around the Z (back-to-front) axis. Further, Choi provides where rotations are extrinsic, i.e., around the X, Y, and Z fixed reference axes and the angles increase clockwise when looking from the origin towards the positive end of an axis. Choi further provides the following definitions for a projection structure and coordinate system in Clause 5.1:

YawAngle indicates the rotation angle around the Y axis, in degrees.
  Type: floating point decimal values
  Range: in the range of −180, inclusive, to 180, exclusive
PitchAngle indicates the rotation angle around the X axis, in degrees.
  Type: floating point decimal values
  Range: in the range of −90, inclusive, to 90, inclusive
RollAngle indicates the rotation angle around the Z axis, in degrees.
  Type: floating point decimal values
  Range: in the range of −180, inclusive, to 180, exclusive.

With respect an equirectangular projection format, Choi provides the following in Clause 5.2:
Equirectangular Projection for One Sample
Inputs to this clause are:
pictureWidth and pictureHeight, which are the width and height, respectively, of the equirectangular panorama picture in samples, and
the center point of a sample location (i, j) along horizontal and vertical axes, respectively.
Outputs of this clause are:
angular coordinates ($\phi$, $\theta$) for the sample in degrees relative to the coordinate axes specified in [Clause 5.1 Projection structure and coordinate system of Choi].
The angular coordinates ($\phi$, $\theta$) for the luma sample location, in degrees, are given by the following equirectangular mapping equations:

$$\phi = (i \div pictureWidth - 0.5) * 360$$

$$\theta = (0.5 - j \div pictureHeight) * 180$$

With respect to conversion between spherical coordinate systems of different orientations, Choi provides the following in Clause 5.3:
Conversion Between Spherical Coordinate Systems of Different Orientations
Inputs to this clause are:
orientation change yaw_center (in the range of −180, inclusive, to 180, exclusive) pitch_center (in the range of −90, inclusive, to 90, inclusive), roll_center (in the range of −180, inclusive, to 180, exclusive), all in units of degrees, and
angular coordinates ($\phi$, $\theta$) relative to the coordinate axes that have been rotated as specified in [Clause 5.1 Projection structure and coordinate system of Choi], and
Outputs of this clause are:
angular coordinates ($\phi'$, $\theta'$) relative to the coordinate system specified in [Clause 5.1 Projection structure and coordinate system of Choi]
The outputs are derived as follows:

$$\alpha = (\text{Clip}_{yaw}(\phi + yaw\_center)) * \pi \div 180$$

$$\beta = (\text{Clip}_{pitch}(\theta + pitch\_center)) * \pi \div 180$$

$$\omega = roll\_center * \pi \div 180$$

$$\phi' = (\cos(\omega) * \alpha - \sin(\omega) * \beta) * 180 \div \pi$$

$$\theta' = (\sin(\omega) * \alpha + \cos(\omega) * \beta) * 180 \div \pi$$

With respect to conversion of sample locations for rectangular region-wise packing, Choi provides the following in Clause 5.4:
Conversion of Sample Locations For Rectangular Region-Wise Packing
Inputs to this clause are:
sample location (x, y) within the packed region in integer sample units,
the width and the height of the projected region in sample units (projRegWidth, projRegHeight),
the width and the height of the packed region in sample units (packedRegWidth, packedRegHeight),
transform type (transformType), and
offset values for sampling position (offsetX, offsetY).
Outputs of this clause are:
the center point of the sample location (i, j) within the projected region in sample units.

The outputs are derived as follows:

```
if( transformType = =0 | | transformType ==1 | | transformType = =2 | |
transformType = = 3 ) {
    horRatio = projRegWidth ÷ packedRegWidth
    verRatio = projRegHeight ÷ packedRegHeight
} else if
( transformType = = 4 | | transformType = = 5 | | transformType = = 6 | |
    transformType = = 7 ) {
    horRatio = projRegWidth ÷ packedRegHeight
    verRatio = projRegHeight ÷ packedRegWidth
}
if( transformType = = 0 ) {
    i = horRatio * ( x + offsetX )
    j = verRatio * ( y + offsetY )
} else if ( transformType = = 1 ) {
    i = horRatio * ( packedRegWidth − x − offsetX )
    j = verRatio * ( y + offsetY )
} else if ( transformType = = 2 ) {
    i = horRatio * ( packedRegWidth − x − offsetX )
    j = verRatio * ( packedRegHeight − y − offsetY )
} else if ( transformType = = 3 ) {
    i = horRatio * ( x + offsetX )
    j = verRatio * ( packedRegHeight − y − offsetY )
} else if ( transformType = = 4 ) {
    i = horRatio * ( y + offsetY )
    j = verRatio * ( x + offsetX )
} else if ( transformType = = 5 ) {
    i = horRatio * ( y + offsetY )
    j = verRatio * ( packedRegWidth − x − offsetX )
} else if ( transformType = = 6 ) {
    i = horRatio * ( packedRegHeight − y − offsetY )
    j = verRatio * ( packedRegWidth − x − offsetX )
} else if ( transformType = = 7 ) {
    i = horRatio * ( packedRegHeight − y − offsetY )
    j = verRatio * ( x+ offsetX )
}
```

Figure 4:
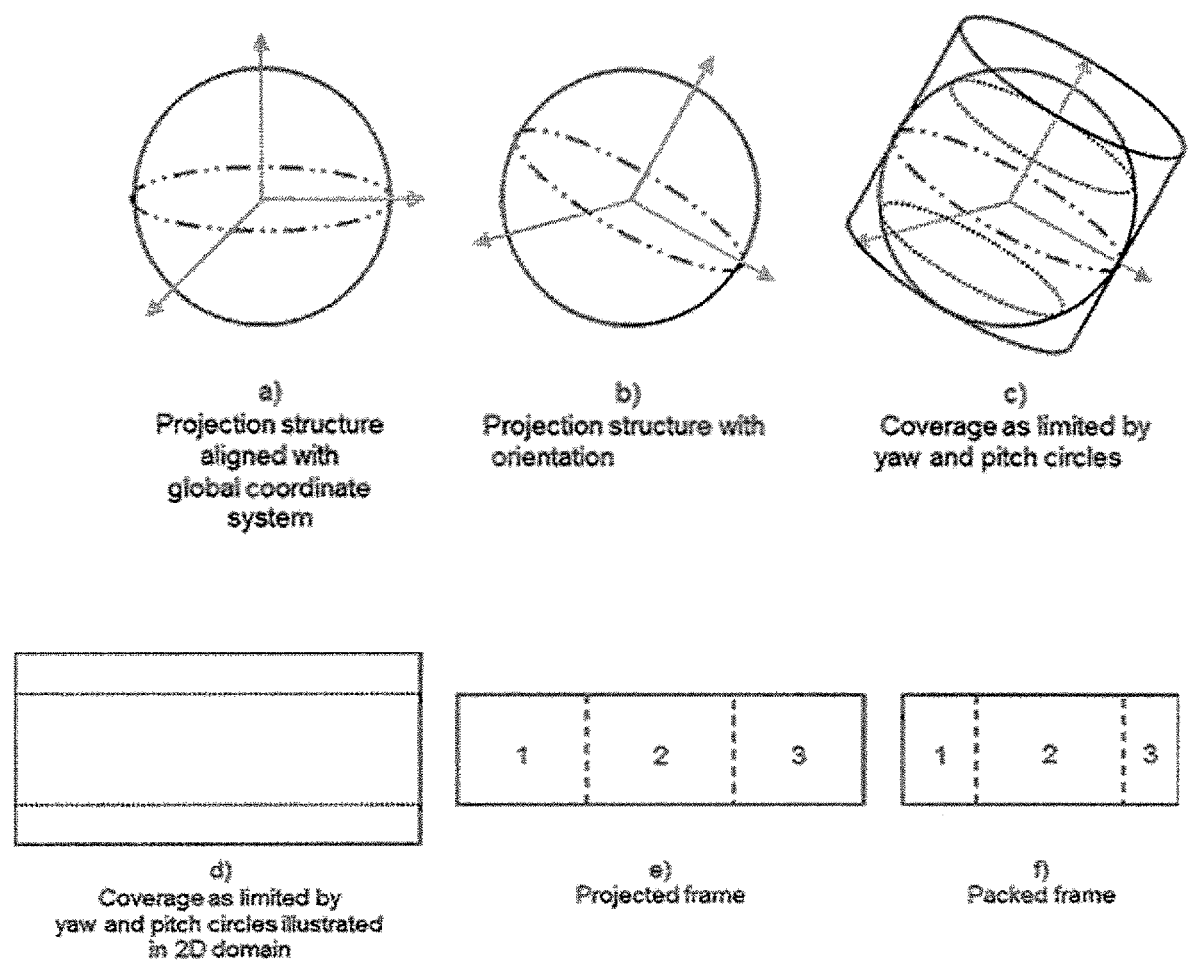
FIG. 4 is a conceptual diagram illustrating an example of processing stages that may be used to derive a packed frame from a spherical projection structure according to one or more techniques of this disclosure.

FIG. 4 illustrates conversions from a spherical projection structure to a packed picture that can be used in content authoring and the corresponding conversions from a packed picture to a spherical projection structure that can be used in content rendering. It should be noted that the example illustrated in FIG. 4 is based on an informative example provided in Choi. However, the example illustrated in FIG. 4 may be generally applicable and should not be construed to limit the scope of techniques for mapping sample locations to angular coordinates described herein.

In the example illustrated in FIG. 4, the projection structure is along a global coordinate axes as illustrated in (a), when the equator of the equirectangular panorama picture is aligned with the X axis of the global coordinate axes, the Y axis of the equirectangular panorama picture is aligned with the Y axis of the global coordinate axes, and the Z axis of the global coordinate axes passes through the middle point of the equirectangular panorama picture.

According to the example illustrated in FIG. 4, content authoring may include one or more the following: rotating a projection structure relative to the global coordinate axes, as illustrated in (b); indicating the coverage as an area enclosed by two yaw circles and two pitch circles, where the yaw and pitch circles may be indicted relative the local coordinate axes; determining a projection picture (or frame); and obtaining a packed picture from a projection picture (e.g., by applying region-wise packing). It should be noted that in the example illustrated in FIG. 4, (c) illustrates an example coverage that is constrained only by two pitch circles while yaw values are not constrained. Further, it should be noted that on a 2D equirectangular domain, the coverage corresponds to a rectangle (i.e., (d) in FIG. 4 indicates the 2D correspondence of (c)), where the X and Y axes of the 2D representation may be aligned with the X and Y local coordinate axes of the projection structure. Further, the projected picture may include a portion of the coverage. In the example illustrated in FIG. 4, the projected picture in (e) includes a portion of the coverage illustrated in (d), which may be specified using horizontal and vertical range values. In the example illustrated in FIG. 4, in (f) the side regions are horizontally down sampled, while the middle region is kept at its original resolution. Further, with respect to FIG. 4, it should be noted that in order to map a sample location of a packed picture to a projection structure used in rendering, a computing device may perform sequential mappings in reverse order from (f) to (a). That is, a video decoding device may map the luma sample locations within a decoded picture to angular coordinates relative to global coordinate axes.

It should be noted that in Choi, if region-wise packing is not applied, the packed frame is identical to the projected frame. Otherwise, regions of the projected frame are mapped onto a packed frame by indicating the location, shape, and size of each region in the packed frame. Further, in Choi, in the case of stereoscopic 360 degree video, the input images of one time instance are stitched to generate a projected frame representing two views, one for each eye. Both views can be mapped onto the same packed frame and encoded by a traditional two-dimensional video encoder. Alternatively, Choi provides, where each view of the projected frame can be mapped to its own packed frame, in which case, the image stitching, projection, and region-wise packing is similar to the monoscopic case described above. Further, in Choi, a sequence of packed frames of either the left view or the right view can be independently coded or, when using a multiview video encoder, predicted from the other view. Finally, it should be noted that in Choi, the image stitching, projection, and region-wise packing process can be carried out multiple times for the same source images to create different versions of the same content, e.g. for different orientations of the projection structure and similarly, the region-wise packing process can be performed multiple times from the same projected frame to create more than one sequence of packed frames to be encoded.

Choi specifies a file format that generally supports the following types of metadata: (1) metadata specifying the projection format of the projected frame; (2) metadata specifying the area of the spherical surface covered by the projected frame; (3) metadata specifying the orientation of the projection structure corresponding to the projected frame in a global coordinate system; (4) metadata specifying region-wise packing information; and (5) metadata specifying optional region-wise quality ranking It should be noted that with respect to the equations used herein, the following arithmetic operators may be used:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\frac{x}{y}$ | Used to denote division in mathematical equations where no truncation or rounding is intended. |

It should be noted that with respect to the equations used herein, the following logical operators may be used:

x&&y Boolean logical "and" of x and y
x||y Boolean logical "or" of x and y
!Boolean logical "not"
x?y z If x is TRUE or not equal to 0, evaluates to the value of y; otherwise, evaluates to the value of z.

It should be noted that with respect to the equations used herein, the following relational operators may be used:

| | |
|---|---|
| > | Greater than |
| >= | Greater than or equal to |
| < | Less than |
| <= | Less than or equal to |
| == | Equal to |
| != | Not equal to |

It should be noted in the syntax used herein, unsigned int(n) refers to an unsigned integer having n-bits. Further, bit(n) refers to a bit value having n-bits.

As described above, Choi specifies how to store omnidirectional media and the associated metadata using the International Organization for Standardization (ISO) base media file format (ISOBMFF). Further, Choi specifies where the file format supports the following types of boxes: a scheme type box (SchemeTypeBox), a scheme information box (SchemeInformationBox), a projected omnidirectional video box (ProjectedOmnidirectionalVideoBox), a stereo video box (StereoVideoBox), a fisheye omnidirectional video box (FisheyeOmnidirectionalVideoBox), a region-wise packing box (RegionWisePackingBox), and a projection orientation box (ProjectionOrientationBox). It should be noted that Choi specifies additional types boxes, for the sake of brevity, a complete description of all the type of boxes specified in Choi are not described herein. With respect to SchemeTypeBox, SchemeInformationBox, ProjectedOmnidirectionalVideoBox, StereoVideoBox, and RegionWisePackingBox, Choi provides the following:

The use of the projected omnidirectional video scheme for the restricted video sample entry type 'resv' indicates that the decoded pictures are packed pictures containing either monoscopic or stereoscopic content. The use of the projected omnidirectional video scheme is indicated by scheme_type equal to 'podv' (projected omnidirectional video) within the SchemeTypeBox.

The use of the fisheye omnidirectional video scheme for the restricted video sample entry type 'resv' indicates that the decoded pictures are fisheye video pictures. The use of the fisheye omnidirectional video scheme is indicated by scheme_type equal to 'fodv' (fisheye omnidirectional video) within the SchemeTypeBox.

The format of the projected monoscopic pictures is indicated with the ProjectedOmnidirectionalVideoBox contained within the SchemeInformationBox. The format of fisheye video is indicated with the FisheyeOmnidirectionalVideoBox contained within the SchemeInformationBox. One and only one ProjectedOmnidirectionalVideoBox shall be present in the SchemeInformationBox when the scheme type is 'podv'. One and only one FisheyeOmnidirectionalVideoBox shall be present in the SchemeInformationBox when the scheme type is 'fodv'.

When the ProjectedOmnidirectionalVideoBox is present in the SchemeInformationBox, StereoVideoBox and RegionWisePackingBox may be present in the same SchemeInformationBox. When FisheyeOmnidirectionalVideoBox is present in the SchemeInformationBox, StereoVideoBox and RegionWisePackingBox shall not be present in the same SchemeInformationBox.

For stereoscopic video, the frame packing arrangement of the projected left and right pictures is indicated with the StereoVideoBox contained within the SchemeInformationBox. The absence of StereoVideoBox indicates that the omnidirectionally projected content of the track is monoscopic. When StereoVideoBox is present in the SchemeInformationBox for the omnidirectional video scheme, stereo_scheme shall be equal to 4 and stereo_indication_type shall indicate that either the top-bottom frame packing or the side-by-side frame packing is in use and that quincunx sampling is not in use.

Optional region-wise packing is indicated with the RegionWisePackingBox contained within the SchemeInformationBox. The absence of RegionWisePackingBox indicates that no region-wise packing is applied, i.e., that the packed picture is identical to the projected picture.

With respect to the projected omnidirectional video box, Choi provides the following definition, syntax and semantics:

Definition

Box Type: 'povd'
Container: Scheme Information box ('schi')
Mandatory: Yes, when scheme_type is equal to 'podv'
Quantity: Zero or one
The properties of the projected frames are indicated with the following:
  the projection format of a monoscopic projected frame (C for monoscopic video contained in the track, $C_L$ and $C_R$ for left and right view of stereoscopic video);
  the orientation of the projection structure relative to the global coordinate system; and
  the spherical coverage of the projected omnidirectional video.

Syntax

```
aligned(8) class ProjectedOmnidirectionalVideoBox extends Box('povd') {
    ProjectionFormatBox( ); // mandatory
    // optional boxes
}
aligned(8) class ProjectionFormatBox( ) extends FullBox('prfr', 0, 0) {
    ProjectionFormatStruct( );
}
aligned(8) class ProjectionFormatStruct( ) {
    bit(3) reserved = 0;
    unsigned int(5) projection_type;
}
```

Semantics projection_type indicates the particular mapping of the rectangular decoder picture output samples onto the spherical coordinate system specified in [Clause 5.1 Projection structure and coordinate system of Choi]. projection_type equal to 0 indicates the equirectangular projection as specified in [Clause 5.2 Omnidirectional projection formats of Choi] Other values of projection_type are reserved.

With respect to the Region-wise packing box, Choi provides the following definition, syntax, and semantics:

Definition

Box Type: 'rwpk'
Container: Scheme Information box ('schi')
Mandatory: No
Quantity: Zero or one
RegionWisePackingBox indicates that projected frames are packed region-wise and require unpacking prior to rendering. The size of the projected picture is explicitly signalled in this box. The size of the packed picture is indicated by the width and height syntax elements of VisualSampleEntry, denoted as PackedPicWidth and PackedPicHeight, respectively.
NOTE 1: When the pictures are field pictures instead of frame pictures, the actual height of the packed pictures would be only half of PackedPicHeight.

Syntax

```
aligned(8) class RegionWisePackingBox extends FullBox('rwpk', 0, 0) {
    RegionWisePackingStruct( );
}
aligned(8) class RegionWisePackingStruct {
    unsigned int(8) num_regions;
    unsigned int(16) proj_picture_width;
    unsigned int(16) proj_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i]) {
                unsigned int(8) left_gb_width[i];
                unsigned int(8) right_gb_width[i];
                unsigned int(8) top_gb_height[i];
                unsigned int(8) bottom_gb_heigh[i];
                unsigned int(1) gb_not_used_for_pred_flag[i];
                unsigned int(3) gb_type[i];
                bit(4) reserved = 0;
            }
        }
    }
}
aligned(8) class RectRegionPacking(i) {
    unsigned int(16) proj_reg_width[i];
    unsigned int(16) proj_reg_height[i];
    unsigned int(16) proj_reg_top[i];
    unsigned int(16) proj_reg_left[i];
    unsigned int(3)  transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
```

Semantics num_regions specifies the number of packed regions, Value 0 is reserved.
proj_picture_width and proj_picture_height specify the width and height, respectively, of the projected picture. proj_picture_width and proj_picture_height shall be greater than 0.
guard_band_flag[i] equal to 0 specifies that the i-th packed region does not have a guard band.
guard_band_flag[i] equal to 1 specifies that the i-th packed region has a guard band.
packing_type[i] specifies the type of region-wise packing. packing_type[i] equal to 0 indicates rectangular region-wise packing. Other values are reserved.
left_gb_width[i] specifies the width of the guard band on the left side of the i-th region in units of two luma samples.
right_gb_width[i] specifies the width of the guard band on the right side of the i-th region in units of two luma samples.
top_gb_height[i] specifies the height of the guard band above the i-th region in units of two luma samples.
bottom_gb_height[i] specifies the height of the guard band below the i-th region in units of two luma samples.
When guard_band_flag[i] is equal to 1, left_gb_width[i], right_gb_width[i], top_gb_height[i], or bottom_gb_height[i] shall be greater than 0.
The i-th packed region as specified by this RegionWisePackingStruct shall not overlap with any other packed region specified by the same RegionWisePackingStruct or any guard band specified by the same RegionWisePackingStruct.
The guard bands associated with the i-th packed region, if any, as specified by this RegionWisePackingStruct shall not overlap with any packed region specified by the same RegionWisePackingStruct or any other guard bands specified by the same RegionWisePackingStruct.
gb_not_used_for_pred_flag[i] equal to 0 specifies that the guard bands may or may not be used in the inter prediction process. gb_not_used_for_pred_flag[i] equal to 1 specifies that the sample values of the guard bands are not in the inter prediction process.
  NOTE 1: When gb_not_used_for_pred_flag[i] is equal to 1, the sample values within guard bands in decoded pictures can be rewritten even if the decoded pictures were used as references for inter prediction of subsequent pictures to be decoded. For example, the content of a packed region can be seamlessly expanded to its guard band with decoded and re-projected samples of another packed region.
gb_type[i] specifies the type of the guard bands for the i-th packed region as follows:
gb_type[i] equal to 0 specifies that the content of the guard bands in relation to the content of the packed regions is unspecified. gb_type shall not be equal to 0, when gb_not_used_for_pred_flag is equal to 0.
gb_type[i] equal to 1 specifies that the content of the guard bands suffices for interpolation of sub-pixel values within the packed region and less than one pixel outside of the boundary of the packed region.
  NOTE 2: gb_type equal to 1 can be used when the boundary samples of a packed region have been copied horizontally or vertically to the guard band.
gb_type[i] equal to 2 specifies that the content of the guard bands represents actual image content at quality that gradually changes from the picture quality of the packed region to that of the spherically adjacent packed region.
gb_type[i] equal to 3 specifies that the content of the guard bands represents actual image content at the picture quality of the packed region.
gb_type[i] values greater than 3 are reserved.
proj_reg_width[i], proj_reg_height[i], proj_reg_top[i] and proj_reg_left[i] are indicated in units of pixels in a projected picture with width and height equal to proj_picture_width and proj_picture_height, respectively.

proj_reg_width[i] specifies the width of the i-th projected region proj_reg_width[i] shall be greater than 0.

proj_reg_height[i] specifies the height of the i-th projected region proj_reg_height[i] shall be greater than 0.

proj_reg_top[i] and proj_reg_left[i] specify the top sample row and the left-most sample column in the projected picture. The values shall be in the range from 0, inclusive, indicating the top-left corner of the projected picture, to proj_picture_height−2, inclusive, and proj_picture_width−2, inclusive, respectively.

proj_reg_width[i] and proj_reg_left[i] shall be constrained such that proj_reg_width[i]+proj_reg_left[i] is less than proj_picture_width.

proj_reg_height[i] and proj_reg_top[i] shall, be constrained such that proj_reg_height[i]+proj_reg_top[i] is less than proj_picture_height.

When the projected picture is stereoscopic, proj_reg_width[i], proj_reg_height[i], proj_reg_top[i] and proj_reg_left[i] shall be such that the projected region identified by these fields is within a single constituent picture of the projected picture.

transform_type[i] specifies the rotation and mirroring that has been applied to the i-th projected region to map it to the packed picture before encoding. When transform_type[i] specifies both rotation and mirroring, rotation has been applied after mirroring in the region-wise packing from the projected picture to the packed picture before encoding. The following values are specified and other values are reserved:

0: no transform
1: mirroring horizontally
2: rotation by 180 degrees (counter-clockwise)
3: rotation by 180 degrees (counter-clockwise) after mirroring horizontally
4: rotation by 90 degrees (counter-clockwise) after mirroring horizontally
5: rotation by 90 degrees (counter-clockwise)
6: rotation by 270 degrees (counter-clockwise) after mirroring horizontally
7: rotation by 270 degrees (counter-clockwise)

NOTE 3: [Clause 5.4 Conversion of sample locations for rectangular region-wise packing of Choi] specifies the semantics of transform_type[i] for converting a sample location of a packed region in a packed picture to a sample location of a projected region in a projected picture.

packed_reg_width[i], packed_reg_height[i], packed_reg_top[i], and packed_reg_left[i] specify the width, height, the top sample row, and the left-most sample column, respectively, of the packed region in the packed picture.

The values of packed_reg_width[i], packed_reg_height[i], packed_reg_top[i], and packed_reg_left[i] are constrained as follows:

packed_reg_width[i] and packed_reg_height[i] shall be greater than 0.

packed_reg_top[i] and packed_reg_left[i] shall in the range from 0, inclusive, indicating the top-left corner of the packed picture, to PackedPicHeight−2, inclusive, and PackedPicWidth−2, inclusive, respectively.

The sum of packed_reg_width[i] and packed_reg_left[i] shall be less than PackedPicWidth.

The sum of packed_reg_height[i] and packed_reg_top[i] shall be less than PackedPicHeight.

The rectangle specified by packed_reg_width[i], packed_reg_height[i], packed_reg_top[i], and packed_reg_left[i] shall be non-overlapping with the rectangle specified by packed_reg_width[j], packed_reg_height[j], packed_reg_top[j], and packed_reg_left[j] for any value of j in the range of 0 to i−1, inclusive.

Figure 6A:
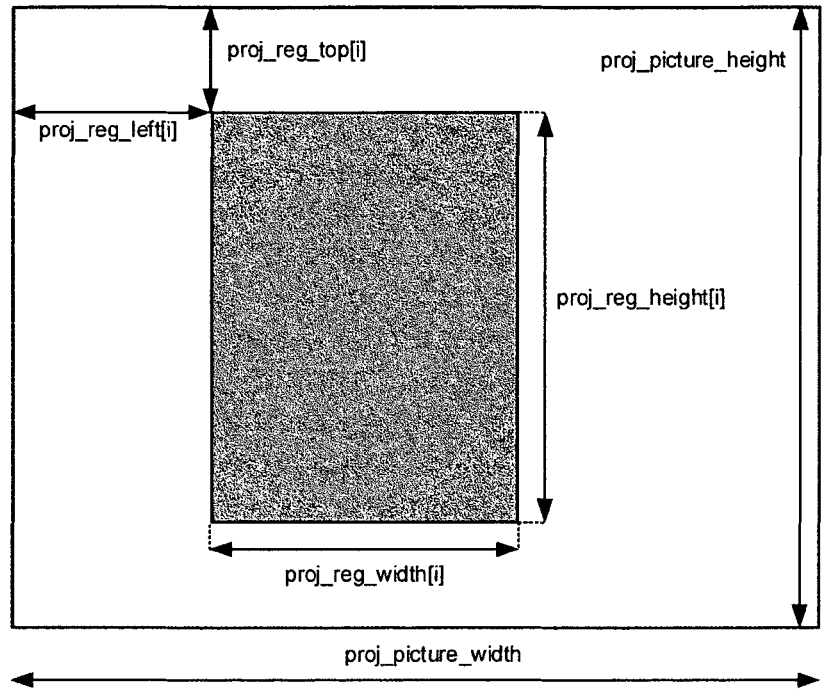
FIG. 6A is a conceptual diagram illustrating examples of a projected picture region according to one or more techniques of this disclosure.
Figure 6B:
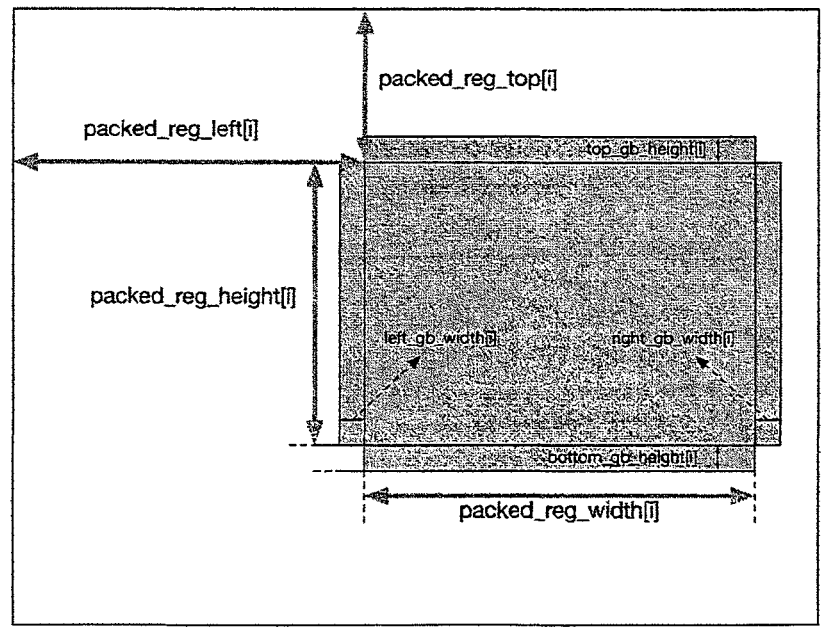
FIG. 6B is a conceptual diagram illustrating examples of a packed picture according to one or more techniques of this disclosure.

FIG. 6A illustrates the position and size of a projected region within a projected picture and FIG. 6B illustrates that of a packed region within a packed picture with guard bands.

With respect to the Projection orientation box, Choi provides the following definition, syntax, and semantics:

Definition

Box Type: 'pror'
Container: Projected omnidirectional video box ('povd')
Mandatory: No
Quantity: Zero or one When the projection format is the equirectangular projection, the fields in this box provides the yaw, pitch, and roll angles, respectively, of the center point of the projected picture when projected to the spherical surface. In the case of stereoscopic omnidirectional video, the fields apply to each view individually. When the ProjectionOrientationBox is not present, the fields orientation_yaw, orientation pitch, and orientation_roll are all considered to be equal to 0.

Syntax

```
aligned(8) class ProjectionOrientationBox extends FullBox('pror',
version = 0, flags) {
  signed int(32) orientation_yaw;
  signed int(32) orientation_pitch;
  signed int(32) orientation_roll;
}
```

Semantics orientation_yaw, orientation_pitch, and orientation_roll specify the yaw, pitch, and roll angles, respectively, of the center point of the projected picture when projected to the spherical surface, in units of $2^{-16}$ degrees relative to the global coordinate axes. orientation_yaw shall be in the range of $-180*2^{16}$ to $180*2^{16}-1$, inclusive. orientation_pitch shall be in the range of $-90*2^{16}$ to $90*2^{16}$, inclusive. orientation_roll shall be in the range of $-180*2^{16}$ to $180*2^{16}-1$, inclusive.

As described above, with respect to FIG. 4, a computing device may map luma sample locations within a picture to angular coordinates relative to global coordinate axes. With respect to mapping of luma sample locations within a decoded picture to angular coordinates relative to the global coordinate axes, Choi provides the following in Clause 7.2.2.2:

Mapping of Luma Sample Locations within a Decoded Picture to Angular Coordinates Relative to the Global Coordinate Axes The width and height of a monoscopic projected luma picture (pictureWidth and pictureHeight, respectively) are derived as follows:

The variables HorDiv and VerDiv are derived as follows:
If StereoVideoBox is absent, HorDiv and VerDiv are set equal to 1.

Otherwise, if StereoVideoBox is present and indicates side-by-side frame packing, HorDiv is set equal to 2 and VerDiv is set equal to 1, Otherwise (StereoVideoBox is present and indicates top-bottom frame packing), HorDiv is set equal to 1 and VerDiv is set equal to 2.

If RegionWisePackingBox is absent, pictureWidth and pictureHeight are set to be equal to width/HorDiv and height/VerDiv, respectively, where width and height are syntax elements of VisualSampleEntry.

Otherwise, pictureWidth and pictureHeight are set equal to proj_picture_width/HorDiv and proj_picture_height/VerDiv, respectively.

If RegionWisePackingBox is present, the following applies for each packed region n in the range of 0 to num_regions−1, inclusive:

For each sample location (xPackedPicture, yPackedPicture) belonging to the n-th packed region with packing_type[n] equal to 0 (i.e., with rectangular region-wise packing), the following applies:

The corresponding sample location (xProjPicture, yProjPicture) of the projected picture is derived as follows:

x is set equal to xPackedPicture−packed_reg_left[n].

y is set equal to yPackedPicture−packed_reg_top[n].

offsetX is set equal to 0.5.

offsetY is set equal to 0.5.

[Clause 5.4 Conversion of sample locations for rectangular region-wise packing of Choi] is invoked with x, y, packed_reg_width[n], packed_reg_height[n], proj_reg_width[n], proj_reg_height[n], transform_type[n], offsetX and offsetY as inputs, and the output is assigned to sample location (i, j).

xProjPicture is set equal to proj_reg_left[n]+i.

yProjPicture is set equal to proj_reg_top[n]+j.

[Clause 7.2.2.3 Conversion from a sample location in a projected picture to angular coordinates relative to the global coordinate axes of Choi] is invoked with xProjPicture, yProjPicture, pictureWidth, and pictureHeight as inputs, and the outputs indicating the angular coordinates and the constituent frame index (for frame packed stereoscopic video) for the luma sample location (xPackedPicture, yPackedPicture) belonging to the n-th packed region in the decoded picture.

Otherwise, the following applies for each sample location (x, y) within the decoded picture:

xProjPicture is set equal to x+0.5.

yProjPicture is set equal to y+0.5.

[Clause 7.2.2.3 Conversion from a sample location in a projected picture to angular coordinates relative to the global coordinate axes of Choi] is invoked with xProjPicture, yProjPicture, pictureWidth, and pictureHeight as inputs, and the outputs indicating the angular coordinates and the constituent frame index (for frame-packed stereoscopic video) for the sample location (x, y) within the decoded picture.

With respect to conversion from a sample location in a projected picture to angular coordinates relative to the global coordinate axes Choi provides the following in Clause 7.2.2.3:

Conversion from a Sample Location in a Projected Picture to Angular Coordinates Relative to the Global Coordinate Axes Inputs to this clause are the center point of a sample location (xProjPicture, yProjPicture) within a projected picture, the picture width pictureWidth, and the picture height pictureHeight.

NOTE: For stereoscopic video, this projected picture is top-bottom or side-by-side frame-packed.

Outputs of this clause are:

angular coordinates (yawGlobal, pitchGlobal), in units of degrees relative to the global coordinate axes, and when StereoVideoBox is present, the index of the constituent picture (constituentPicture) equal to 0 or 1.

The outputs are derived with the following ordered steps:

If xProjPicture is greater than or equal to pictureWidth or yProjPicture is greater than pictureHeight, the following applies:

constituentPicture is set equal to 1.

If xProjPicture is greater than or equal to pictureWidth, xProjPicture is set to xProjPicture−pictureWidth.

If yProjPicture is greater than or equal to pictureHeight, yProjPicture is set to yProjPicture−pictureHeight.

Otherwise, constituentPicture is set equal to 0,

[Clause 5.2.1 Equirectangular projection for one sample of Choi] is invoked with pictureWidth, pictureHeight, xProjPicture, and yProjPicture as inputs, and the output is assigned to yawLocal, pitchLocal.

If ProjectionOrientationBox is present, clause [5.3 Conversion between spherical coordinate systems of different orientations] is invoked with yawLocal, pitchLocal, orientation_yaw÷$2^{16}$, orientation_pitch÷$2^{16}$, and orientation_roll÷$2^{16}$ as inputs, and the output is assigned to yawGlobal and pitchGlobal.

Otherwise, yawGlobal is set equal to yawLocal and pitchGlobal is set equal to pitchLocal.

The techniques for signaling information associated with region-wise packing provided in Choi may be less than ideal.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 5:
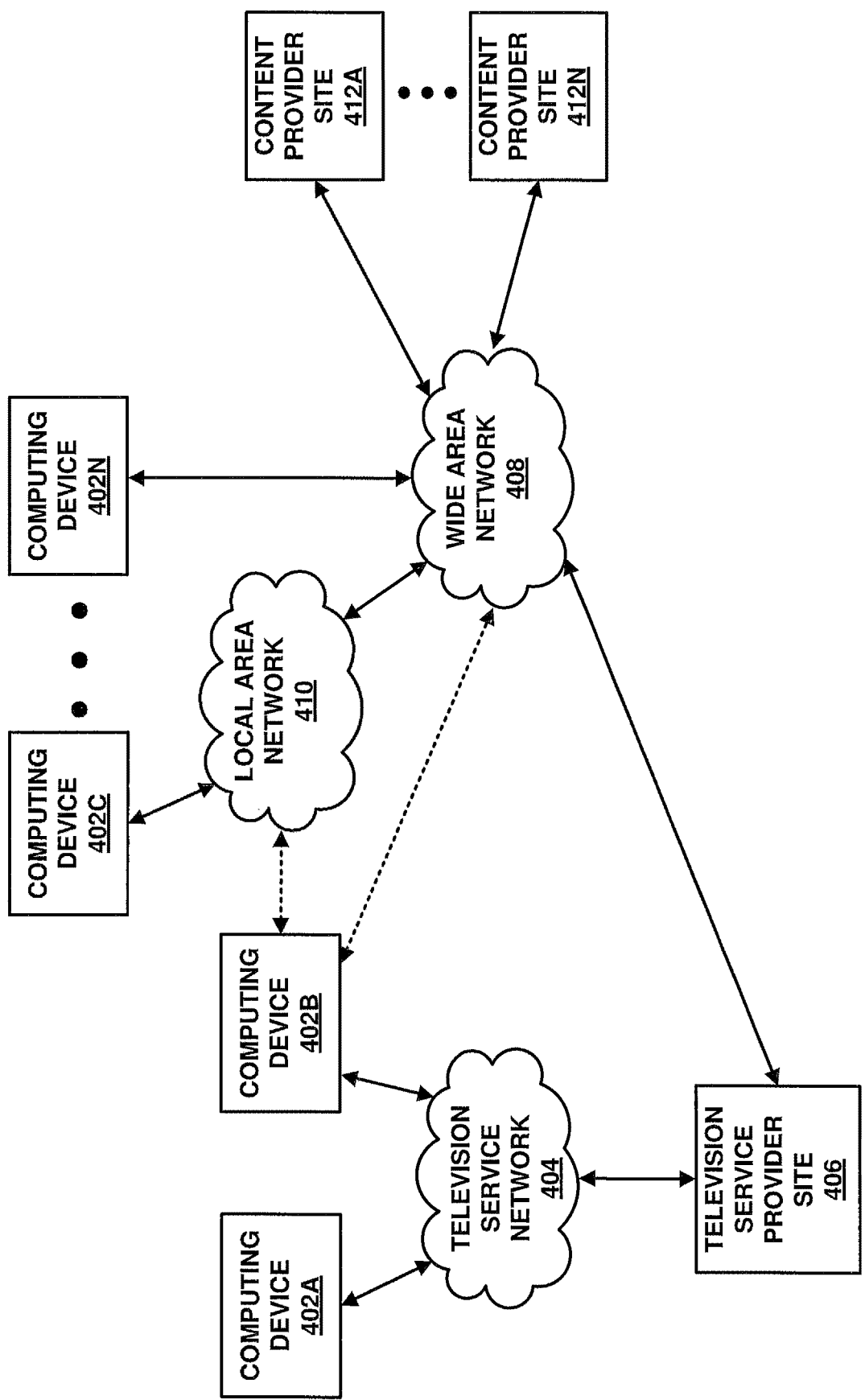
FIG. 5 is a block diagram illustrating an example of components that may be included in an implementation of a system that may be configured to distribute coded video data according to one or more techniques of this disclosure.

FIG. 5 is a conceptual drawing illustrating an example of components that may be included in an implementation of system 100. In the example implementation illustrated in FIG. 5, system 100 includes one or more computing devices 402A-402N, television service network 404, television service provider site 406, wide area network 408, local area network 410, and one or more content provider sites 412A-412N. The implementation illustrated in FIG. 5 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 5, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 5, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 5, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 480 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 5, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. It should be noted that the term conforming bitstream may be used in place of the term compliant bitstream. As described above, the techniques for signaling information associated with region-wise packing in Choi may be less than ideal. In one example, data encapsulator 107 may be configured to signal information associated with region-wise packing according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 5.

It should be noted that as used herein the term constituent picture may generally refer to a left or right view part of the picture corresponding to a stereoscopic content. In the context of the syntax and semantics provided herein, a constituent picture may be defined based on the following example definition:

Constituent picture: Part of the picture corresponding to a stereoscopic content that has an index (constituentPicture) in [clause 7.2.2.3 Conversion from a sample location in a projected picture to angular coordinates relative to the global coordinate axes of Choi]

It should be noted that in some cases, a constituent picture part of a projected picture may be referred to as "constituent picture of a projected picture," and a constituent picture part of a packed picture may be referred to as "constituent picture of a packed picture."

Alternatively, with respect to the syntax and semantics provided herein, a constituent picture may be defined as: Left or right view part of the picture corresponding to a stereoscopic content.

Alternatively, with respect to the syntax and semantics provided herein, a constituent picture may be defined as: Left or right view part of the picture when StereoVideoBox is present.

It should be noted that the terms "Constituent picture" and "Constituent frame" and generally the term "Constituent picture index" and "Constituent frame index" may be used interchangeably.

Referring to the RegionWisePackingBox in Choi described above, in one example, data encapsulator 107 may be configured to signal a RegionWisePackingBox based on the following example syntax and semantics:

Syntax

```
aligned(8) class RegionWisePackingBox extends FullBox('rwpk', 0, 0) {
    RegionWisePackingStruct( );
}
aligned(8) class RegionWisePackingStruct {
    unsigned int(1) constituent_picture_matching_regions;
    bit(7) reserved = 0;
    unsigned int(8) num_regions;
    unsigned int(16) proj_picture_width;
    unsigned int(16) proj_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i]) {
                unsigned int(8) left_gb_width[i];
                unsigned int(8) right_gb_width[i];
                unsigned int(8) top_gb_height[i];
                unsigned int(8) bottom_gb_height[i];
                unsigned int(1) gb_not_used_for_pred_flag[i];
                unsigned int(3) gb_type[i];
                bit(4) reserved = 0;
            }
        }
    }
}
aligned(8) class RectRegionPacking(i) {
    unsigned int(16) proj_reg_width[i];
    unsigned int(16) proj_reg_height[i];
    unsigned int(16) proj_reg_top[i];
    unsigned int(16) proj_reg_left[i];
    unsigned int(3)  transform_type[i];
    bit(5) reserved = 0;
    unsigned int(16) packed_reg_width[i];
    unsigned int(16) packed_reg_height[i];
```

```
    unsigned int(16) packed_reg_top[i];
    unsigned int(16) packed_reg_left[i];
}
```

Semantics constituent_picture_matching_regions equal to 1 indicates that the projected region information, packed region information and guard band region information signaled in this box applies individually to each constituent picture. constituent_picture_matching_regions equal to 0 indicates that the projected region information, packed region information and guard band region information signaled in this box applies to projected picture.

constituent_picture_matching_regions shall not be equal to 1 if StereoVideoBox is not present.

NOTE 1: For the stereoscopic content which uses similar region-wise packing for the constituent pictures, setting this flag equal to 1 allows more compact signaling of region-wise packing information.

num_regions specifies the number of packed regions. Value 0 is reserved.

If constituent_picture_matching_regions is equal to 1 the total number of packed regions is equal to 2*num_regions and the information in RectRegionPacking(i) including proj_reg_width proj_reg_height, proj_reg_top[i] proj_reg_left[i], packed_reg_width[i], packed_reg_height[i], packed_reg_top[i], packed_reg_left[i] and in guard_band_flag[i], packing_type[i], left_gb_width[i], right_gb_width[i], top_gb_height[i], bottom_gb_height[i], gb_not_used_for_pred_flag[i], gb_type[i] applies to each constituent picture of projected picture and packed picture.

proj_picture_width and proj_picture_height specify the width and height, respectively, of the projected picture. proj_picture_width and proj_picture_height shall be greater than 0.

guard_band_flag[i] equal to 0 specifies that the i-th packed region does not have a guard band.

guard_band_flag[i] equal to 1 specifies that the i-th packed region has a guard band.

packing_type[i] specifies the type of region-wise packing. packing_type[i] equal to 0 indicates rectangular region-wise packing. Other values are reserved.

left_gb_width[i] specifies the width of the guard band on the left side of the i-th region in units of two luma samples.

right_gb_width[i] specifies the width of the guard band on the right side of the i-th region in units of two luma samples.

top_gb_height[i] specifies the height of the guard band above the i-th region in units of two luma samples, bottom_gb_height[i] specifies the height of the guard band below the i-th region in units of two luma samples.

When guard_band_flag[i] is equal to 1, left_gb_width[i], right_gb_width[i], top_gb_height[i], or bottom_gb_height[i] shall be greater than 0.

The i-th packed region as specified by this RegionWisePackingStruct shall not overlap with any other packed region specified by the same RegionWisePackingStruct or any guard band specified by the same RegionWisePackingStruct.

The guard bands associated with the i-th packed region, if any, as specified by this RegionWisePackingStruct shall not overlap with any packed region specified by the same RegionWisePackingStruct or any other guard bands specified by the same RegionWisePackingStruct.

gb_not_used_for_pred_flag[i] equal to 0 specifies that the guard bands may or may not be used in the inter prediction process. gb_not_used_for_pred_flag[i] equal to 1 specifies that the sample values of the guard bands are not in the inter prediction process.

NOTE 2: When gb_not_used_for_pred_flag[i] is equal to 1, the sample values within guard bands in decoded pictures can be rewritten even if the decoded pictures were used as references for inter prediction of subsequent pictures to be decoded. For example, the content of a packed region can be seamlessly expanded to its guard band with decoded and re-projected samples of another packed region.

gb_type[i] specifies the type of the guard bands for the i-th packed region as follows:

gb_type[i] equal to 0 specifies that the content of the guard bands in relation to the content of the packed regions is unspecified. gb_type shall not be equal to 0, when gb_not_used_for_pred_flag is equal to 0.

gb_type[i] equal to 1 specifies that the content of the guard bands suffices for interpolation of sub-pixel values within the packed region and less than one pixel outside of the boundary of the packed region.

NOTE 3: gb_type equal to 1 can be used when the boundary samples of a packed region have been copied horizontally or vertically to the guard band.

gb_type[i] equal to 2 specifies that the content of the guard bands represents actual image content at quality that gradually changes from the picture quality of the packed region to that of the spherically adjacent packed region.

gb_type[i] equal to 3 specifies that the content of the guard bands represents actual image content at the picture quality of the packed region.

gb_type[i] values greater than 3 are reserved.

If constituent_picture_matching_regions is equal to 0, proj_reg_width[i], proj_reg_height[i], proj_reg_top[i] and proj_reg_left[i] are indicated in units of pixels in a projected picture with width and height equal to proj_picture_width and proj_picture_height, respectively.

If constituent_picture_matching_regions is equal to 1:

When StereoVideoBox is present and indicates side-by-side frame packing, HorDiv1 is set equal to 2 and VerDiv1 is set equal to 1.

When StereoVideoBox is present and indicates top-bottom frame packing, HorDiv1 is set equal to 1 and VerDiv1 is set equal to 2.

proj_reg_width[i], proj_reg_height[i], proj_reg_top[i] and proj_reg_left[i] are indicated in units of pixels in each constituent picture of a projected picture with width and height equal to proj_picture_width/HorDiv1 and proj_picture_height/VerDiv1, respectively.

packed_reg_width[i], packed_reg_height[i], packed_reg_top[i] and packed_reg_left[i] are indicated in units of pixels in each constituent picture of a packed picture with width and height equal to PackedPicWidth/HorDiv1 and PackedPicHeight/VerDiv1, respectively.

proj_reg_width[i] specifies the width of the i-th projected region proj_reg_width[i] shall be greater than 0.

proj_reg_height[i] specifies the height of the i-th projected region proj_reg_height[i] shall be greater than 0.

proj_reg_top[i] and proj_reg_left[i] specify the top sample row and the left-most sample column in the projected picture if constituent_picture_matching_regions is equal to 0 or in the constituent picture of the projected picture if constituent_picture_matching_regions is equal to 1.

If constituent_picture_matching_regions is equal to 0 the values proj_reg_top[i] and proj_reg_left[i] shall be in the range from 0, inclusive, indicating the top-left corner of the projected picture, to proj_picture_height−2, inclusive, and proj_picture_width−2, inclusive, respectively.

If constituent_picture_matching_regions is equal to 1 and StereoVideoBox indicates side-by-side frame packing, the values proj_reg_top[i] and proj_reg_left[i] shall be in the range from 0, inclusive, indicating the top-left corner of the projected picture, to proj_picture_height−1 and proj_picture_width/2−1, inclusive, respectively.

If constituent_picture_matching_regions is equal to 1 and StereoVideoBox indicates top-bottom frame packing, the values proj_reg_top[i] and proj_reg_left[i] shall be in the range from 0, inclusive, indicating the top-left corner of the projected picture, to proj_picture_height/2−1 and proj_picture_width−1, inclusive, respectively.

In another example,
- If constituent_picture_matching_regions is equal to 0 the values proj_reg_top[i] and proj_reg_left[i]shall be in the range from 0, inclusive, indicating the top-left corner of the projected picture, to proj_picture_height−2 and proj_picture_width−2, inclusive, respectively.
- If constituent_picture_matching_regions is equal to 1 and StereoVideoBox indicates side-by-side frame packing, the values proj_reg_top[i] and proj_reg_left[i] shall be in the range from 0, inclusive, indicating the top-left corner of the projected picture, to proj_picture_height−2 and proj_picture_width/2−2, inclusive, respectively.
- If constituent_picture_matching_regions is equal to 1 and StereoVideoBox indicates top-bottom frame packing, the values proj_reg_top[i] and proj_reg_left[i] shall be in the range from 0, inclusive, indicating the top-left corner of the projected picture, to proj_picture_height/2−2 and proj_picture_width−2, inclusive, respectively.

If no StereoVideoBox is present, the following constraints may apply:
- proj_reg_width[i] and proj_reg_left[i] shall, be constrained such that proj_reg_width[i]+proj_reg_left[i]−1 is less than proj_picture_width.
- proj_reg_height[i] and proj_reg_top[i] shall be constrained such that proj_reg_height[i]+proj_reg_top[i]−1 is less than proj_picture_height.

If StereoVideoBox is present and indicates side-by-side frame packing and constituent_picture_matching_regions is equal to 0, the following constraints may apply:
- proj_reg_width[i] shall be less than or equal to proj_picture_width/2.
- If proj_reg_left[i] is less than proj_picture_width/2 then proj_reg_width[i] and proj_reg_left[i] shall be constrained such that proj_reg_width[i]+proj_reg_left[i]−1 is less than proj_picture_width/2.
- Otherwise (i.e. when proj_reg_left[i] is greater than or equal to proj_picture_width/2) then proj_reg_width[i] and proj_reg_left[i] shall be constrained that proj_reg_width[i]+proj_reg_left[i]−proj_picture_width/2−1 is less than proj_picture_width/2.
- proj_reg_height[i] and proj_reg_top[i] shall be constrained such that proj_reg_height[i]+proj_reg_top[i]−1 is less than proj_picture_height.

If StereoVideoBox is present and indicates top-bottom frame packing and constituent_picture_matching_regions is equal to 0, the following constraints may apply:
- proj_reg_height[i] shall be less than or equal to proj_picture_height/2.
- proj_reg_width[i] and proj_reg_left[i] shall be constrained such that proj_reg_width[i]+proj_reg_left[i]−1 is less than proj_picture_width.
- If proj_reg_top[i] is less than proj_picture_height/2 then proj_reg_height[i] and proj_reg_top[i] shall be constrained such that proj_reg_height[i]+proj_reg_top[i]−1 is less than proj_picture_height/2.
- Otherwise (i.e. when proj_reg_top[i] is greater than or equal to proj_picture_height/2) then proj_reg_height[i] and proj_reg_top[i] shall be constrained such that proj_reg_height[i]+proj_reg_top[i]−proj_picture_height/2−1 is less than proj_picture_height/2.

If StereoVideoBox is present and indicates side-by-side frame packing and constituent_picture_matching_regions is equal to 1, the following constraints may apply:
- proj_reg_width[i] shall be less than or equal to proj_picture_width/2.
- proj_reg_width[i] and proj_reg_left[i] shall be constrained such that proj_reg_width[i]+proj_reg_left[i]−1 is less than proj_picture_width/2.
- proj_reg_height[i] and proj_reg_top[i] shall be constrained such that proj_reg_height[i]+proj_reg_top[i]−1 is less than proj_picture_height.

If StereoVideoBox is present and indicates top-bottom frame packing and constituent_picture_matching_regions is equal to 1, the following constraints may apply:
- proj_reg_height[i] shall be less than or equal to proj_picture_height/2.
- proj_reg_width[i] and proj_reg_left[i] shall be constrained such that proj_reg_width[i]+proj_reg_left[i]−1 is less than proj_picture_width.
- proj_reg_height[i] and proj_reg_top[i] shall be constrained such that proj_reg_height[i]+proj_reg_top[i]−1 is less than proj_picture_height/2.

If StereoVideoBox is present and indicates side-by-side frame packing, proj_reg_width[i] shall be less than or equal to proj_picture_width/2.

If StereoVideoBox is present and indicates top-bottom frame packing, proj_reg_height[i] shall be less than or equal to proj_picture_height/2.

When the projected picture is stereoscopic, proj_reg_width[i], proj_reg_height[i], proj_reg_top[i] and proj_reg_left[i] shall be such that the projected region identified by these fields is within a single constituent picture of the projected picture.

transform_type[i] specifies the rotation and mirroring that has been applied to the i-th projected region to map it to the packed picture before encoding. When transform_type[i] specifies both rotation and mirroring, rotation has been applied after mirroring in the region-wise packing from the projected picture to the packed picture before encoding. The following values are specified and other values are reserved:
0: no transform
1: mirroring horizontally
2: rotation by 180 degrees (counter-clockwise)

3: rotation by 180 degrees (counter-clockwise) after mirroring horizontally
4: rotation by 90 degrees (counter-clockwise) after mirroring horizontally
5: rotation by 90 degrees (counter-clockwise)
6: rotation by 270 degrees (counter-clockwise) after mirroring horizontally
7: rotation by 270 degrees (counter-clockwise)
NOTE 4: [Clause 5.4 Conversion of sample locations for rectangular region-wise packing of Choi] specifies the semantics of transform_type[i] for converting a sample location of a packed region in a packed picture to a sample location of a projected region in a projected picture.
packed_reg_width[i], packed_reg_height[i], packed_reg_top[i], and packed_reg_left[i] specify the width, height, the top sample row, and the left-most sample column, respectively, of the packed region in the packed picture if constituent_picture_matching_regions is equal to 0 or in the constituent picture of packed picture if constituent_picture_matching_regions is equal to 1.
The values of packed_reg_width[i], packed_reg_height [i], packed_reg_top[i], and packed_reg_left[i] are constrained as follows:
packed_reg_width[i] and packed_reg_height [i] shall be greater than 0.
packed_reg_top[i] and packed_reg_left[i] shall in the range from 0, inclusive, indicating the top-left corner of the packed picture, to PackedPicHeight−2, inclusive, and PackedPicWidth−2, inclusive, respectively.
In another, example: packed_reg_top[i] and packed_reg_left[i] shall in the range from 0, inclusive, indicating the top-left corner of the packed picture, to PackedPicHeight−1, inclusive, and PackedPicWidth−1, inclusive, respectively.
If no StereoVideoBox is present and constituent_picture_matching_regions is equal to 0:
The sum of packed_reg_width[i] and packed_reg_left[i] shall be less than PackedPicWidth.
The sum of packed_reg_height[i] and packed_reg_top[i] shall be loss than PackedPicHeight.
In another example:
The sum of packed_reg_width[i] and packed_reg_left[i] minus 1 shall be less than PackedPicWidth.
The sum of packed_reg_height[i] and packed_reg_top[i] minus 1 shall be less than PackedPicHeight.
If StereoVideoBox is present and indicates side-by-side frame packing and constituent_picture_matching_regions is equal to 1:
The sum of packed_reg_width[i] and packed_reg_left[i] shall be less than PackedPicWidth/2.
The sum of packed_reg_height[i] and packed_reg_top[i] shall be less than PackedPicHeight.
In another example:
The sum of packed_reg_width[i] and packed_reg_left[i] minus 1 shall be less than PackedPicWidth/2.
The sum of packed_reg_height[i] and packed_reg_top[i] minus 1 shall be less than PackedPicHeight
If StereoVideoBox is present and indicates top-bottom frame packing and constituent_picture_matching_regions is equal to 1:
The sum of packed_reg_width[i] and packed_reg_left[i] shall be less than PackedPicWidth.
The sum of packed_reg_height[i] and packed_reg_top[i] shall be less than PackedPicHeight/2.

In another example:
The sum of packed_reg_width[i] and packed_reg_left[i] minus 1 shall be less than PackedPicWidth.
The sum of packed_reg_height[i] and packed_reg_top[i] minus 1 shall be less than PackedPicHeight/2,
For each value of i in the range of 0 to num_regions−1, inclusive, the rectangle specified by packed_reg_width[i], packed_reg_height[i], packed_reg_top[i], and packed_reg_left[i] shall be non-overlapping with the rectangle specified by packed_reg_width[j], packed_reg_height[j], packed_reg_top[j], and packed_reg_left[j] for any value of j in the range of 0 to i−1, inclusive.

In one example, data encapsulator 107 may be configured to signal a RegionWisePackingBox based on the syntax provided above and the following example semantics:

Semantics constituent_picture_matching_regions equal to 1 indicates that the projected region information, packed region information and guard band region information signaled in this box applies individually to each constituent picture. constituent_picture_matching_regions equal to 0 indicates that the projected region information, packed region information and guard band region information signaled in this box applies to projected picture.
constituent_picture_matching_regions shall not be equal to 1 if StereoVideoBox is not present.
NOTE 1: For the stereoscopic content which uses similar region-wise packing for the constituent pictures, setting this flag equal to 1 allows more compact signaling of region-wise packing information.
num_regions specifies the number of packed regions. Value 0 is reserved.
If constituent_picture_matching_regions is equal, to 1. the total number of packed regions is equal to 2*num_regions and the information in RectRegionPacking(i) including proj_reg_width[i], proj_reg_height[i], proj_reg_top[i] proj_reg_left[i], packed_reg_width[i], packed_reg_height[i], packed_reg_top[i], packed_reg_left[i] and in guard_band_flag[i], packing_type[i], left_gb_width[i], right_gb_width[i], top_gb_height[i], bottom_gb_height[i], gb_not_used_for_pred_flag[i], gb_type[i] applies to each constituent picture of projected picture and packed picture.
proj_picture_width and proj_picture_height specify the width and height, respectively, of the projected picture. proj_picture_width and proj_picture_height shall be greater than 0.
guard_band_flag[i] equal to 0 specifies that the i-th packed region does not have a guard band.
guard band_flag[i] equal to 1 specifies that the i-th packed region has a guard band.
packing_type[i] specifies the type of region-wise packing. packing_type[i] equal to 0 indicates rectangular region-wise packing. Other values are reserved.
left_gb_width [i] specifies the width of the guard band on the left side of the i-th region in units of two luma samples.

right_gb_width[i] specifies the width of the guard band on the right side of the i-th region in units of two luma samples.

top_gb_height[i] specifies the height of the guard band above the i-th region in units of two luma samples.

bottom_gb_height[i] specifies the height of the guard band below the i-th region in units of two luma samples.

When guard_band_flag[i] is equal to 1, left_gb_width[i], right_gb_width[i], top_gb_height[i], or bottom_gb_height[i] shall be greater than 0.

The i-th packed region as specified by this RegionWisePackingStruct shall not overlap with any other packed region specified by the same RegionWisePackingStruct or any guard band specified by the same RegionWisePackingStruct.

The guard bands associated with the i-th packed region, if any, as specified by this RegionWisePackingStruct shall not overlap with any packed region specified by the same RegionWisePackingStruct or any other guard bands specified by the same RegionWisePackingStruct.

gb_not_used_for_pred_flag[i] equal to 0 specifies that the guard bands may or may not be used in the inter prediction process. gb_not_used_for_pred_flag[i] equal to 1 specifies that the sample values of the guard bands are not in the inter prediction process.

NOTE 2: When gb_not_used_for_pred_flag[i] is equal to 1, the sample values within guard bands in decoded pictures can be rewritten even if the decoded pictures were used as references for inter prediction of subsequent pictures to be decoded. For example, the content of a packed region can be seamlessly expanded to its guard band with decoded and re-projected samples of another packed region.

gb_type[i] specifies the type of the guard bands for the i-th packed region as follows:

gb_type[i] equal to 0 specifies that the content of the guard bands in relation to the content of the packed regions is unspecified. gb_type shall not be equal to 0, when gb_not_used_for_pred_flag is equal to 0.

gb_type[i] equal to 1 specifies that the content of the guard bands suffices for interpolation of sub-pixel values within the packed region and less than one pixel outside of the boundary of the packed region.

NOTE 3: gb_type equal to 1 can be used when the boundary samples of a packed region have boon copied horizontally or vertically to the guard band.

gb_type[i] equal to 2 specifies that the content of the guard bands represents actual image content at quality that gradually changes from the picture quality of the packed region to that of the spherically adjacent packed region.

gb_type[i] equal to 3 specifies that the content of the guard bands represents actual image content at the picture quality of the packed region.

gb_type[i] values greater than 3 are reserved.

If constituent_picture_matching_regions is equal to 0, proj_reg_width[i], proj_reg_height[i], proj_reg_top[i] and proj_reg_left[i] are indicated in units of pixels in a projected picture with width and height equal to proj_picture_width and proj_picture_height, respectively.

The values of the variables HorDiv1 and VerDiv1 are set as follows:

When StereoVideoBox is absent HorDiv1 is set equal to 1 and VerDiv is set equal to 1.

When StereoVideoBox is present and indicates side-by-side frame packing, HorDiv1 is set equal to 2 and VerDiv1 is set equal to 1.

When StereoVideoBox is present and indicates top-bottom frame packing, HorDiv1 is set equal to 1 and VerDiv1 is set equal to 2.

If constituent_picture_matching_regions is equal to 1:

proj_reg_width[i], proj_reg_height[i], proj_reg_top [i] and proj_reg_left[i] are indicated in units of pixels in each constituent picture of a projected picture with width and height equal to proj_picture_width/HorDiv1 and proj_picture_height/VerDiv1, respectively.

packed_reg_width[i] packed_reg_height[i], packed_reg_top[i] and packed_reg_left[i] are indicated in units of pixels in each constituent picture of a packed picture with width and height equal to PackedPicWidth/HorDiv1 and PackedPicHeight/VerDiv1, respectively.

proj_reg_width[i] specifies the width of the i-th projected region proj_reg_width[i] shall be greater than 0.

proj_reg_height[i] specifies the height of the i-th projected region proj_reg_height[i] shall be greater than 0.

proj_reg_top[i] and proj_reg_left[i] specify the top sample row and the left-most sample column in the projected picture if constituent_picture_matching_regions is equal to 0 or in the constituent picture of the projected picture if constituent_picture_matching_regions is equal to 1.

If constituent_picture_matching_regions is equal to 0 the values proj_reg_top[i] and proj_reg_left[i] shall be in the range from 0, inclusive, indicating the top-left corner of the projected picture, to proj_picture_height−1, inclusive, and proj_picture_width−1, inclusive, respectively.

If constituent_picture_matching_regions is equal to 1, the values proj_reg_top[i] and proj_reg_left[i] shall be in the range from 0, inclusive, to proj_picture_height/VerDiv1−1 and proj_picture_width/HorDiv1−1, inclusive, respectively.

If no StereoVideoBox is present, the following constraints may apply:

proj_reg_width[i] and proj_reg_left[i] shall be constrained such that proj_reg_width[i]+proj_reg_left[i]−1 is less than proj_picture_width.

proj_reg_height[i] and proj_reg_top[i] shall be constrained such that proj_reg_height[i]+proj_reg_top[i]−1 is less than proj_picture_height.

When the projected picture is stereoscopic, proj_reg_width[i], proj_reg_height[i], proj_reg_top[i] and proj_reg_left[i] shall be such that the projected region identified by these fields is within a single constituent picture of the projected picture.

transform_type[i] specifies the rotation and mirroring that has been applied to the i-th projected region to map it to the packed picture before encoding. When transform_type[i] specifies both rotation and mirroring, rotation has been applied after mirroring in the region-wise packing from the projected picture to the packed picture before encoding. The following values are specified and other values are reserved:

0: no transform
1: mirroring horizontally
2: rotation by 180 degrees (counter-clockwise)
3: rotation by 180 degrees (counter-clockwise) after mirroring horizontally
4: rotation by 90 degrees (counter-clockwise) after mirroring horizontally 5: rotation by 90 degrees (counter-clockwise)
6: rotation by 270 degrees (counter-clockwise) after mirroring horizontally
7: rotation by 270 degrees (counterclockwise)
NOTE 4: [Clause 5.4 Conversion of sample locations for rectangular region-wise packing of Choi] specifies the semantics of transform_type[i] for converting a sample location of a packed region in a packed picture to a sample location of a projected region in a projected picture.

packed_reg_width[i,], packed_reg_height[i], packed_reg_top[i], and packed_reg_left[i] specify the width, height, the top sample row, and the left-most sample column, respectively, of the packed region in the packed picture if
constituent_picture_matching_regions is equal to 0 or in the constituent picture of packed picture if constituent_picture_matching_regions is equal to 1.

The values of packed_reg_width[i], packed_reg_height[i], packed_reg_top[i], and packed_reg_left[i] are constrained as follows:
packed_reg_width[i] and packed_reg_height[i] shall be greater than 0.
packed_reg_top[i] and packed_reg_left[i] shall be in the range from 0, inclusive, indicating the top-left corner of the packed picture, to PackedPicHeight−1, inclusive, and PackedPicWidth−1, inclusive, respectively.
If no StereoVideoBox is present and constituent_picture_matching_regions is equal to 0:
 The sum of packed_reg_width[i] and packed_reg_left[i] minus 1 shall be less than PackedPicWidth.
 The sum of packed_reg_height[i] and packed_reg_top[i] minus 1 shall be less than PackedPicHeight.
If constituent_picture_matching_regions is equal to 1:
 The sum of packed_reg_width[i] and packed_reg_left[i] minus 1 shall be less than PackedPicWidth/HorDiv1.
 The sum of packed_reg_height[i] and packed_reg_top[i] minus 1 shall be less than PackedPicHeight/VerDiv1.
The rectangle specified by packed_reg_width[i], packed_reg_height_packed_reg_top[i] and packed_reg_left[i] shall be non-overlapping with the rectangle specified by packed_reg_width[j], packed_reg_height[j], packed_reg_top[j], and packed_reg_left[j] for any value of j in the range of 0 to i−1, inclusive.

It should be noted that with respect to the example semantics above, the following conditions are possible: (1) no StereoVideoBox is present; (2) StereoVideoBox is present and indicates side-by-side frame packing and constituent_picture_matching_regions is equal to 0; (3) StereoVideoBox is present and indicates top-bottom frame packing and constituent_picture_matching_regions is equal to 0; (4) StereoVideoBox is present and indicates side-by-side frame packing and constituent_picture_matching_regions is equal to 1; (5) StereoVideoBox is present and indicates top-bottom frame packing and constituent_picture_ matching_regions is equal to 1. With respect to constraints to proj_reg_left[i], proj_reg_width[i], proj_reg_top[i], and proj_reg_height[i] occurring when StereoVideoBox is present and indicates side-by-side frame packing and StereoVideoBox is present and indicates top-bottom frame packing and further conditioned on constituent_picture_matching_regions, in one example, the constraints in the semantics above occurring when constituent_picture_matching_regions is equal to 0 may be applied independent of the value of constituent_picture_matching_regions. In one example, the constraints in the semantics above occurring when constituent_picture_matching_regions is equal to 1 may be applied independent of the value of constituent_picture_matching_regions.

In one example, the following constraints may be imposed in the case where constituent_picture_matching_flag is not signaled:
If no StereoVideoBox is present:
 proj_reg_width[i] and proj_reg_left[i] shall be constrained such that proj_reg_width[i]+proj_reg_left[i]−1 is less than proj_picture_width.
 proj_reg_height[i] and proj_reg_top[i] shall be constrained such that proj_reg_height[i]+proj_reg_top[i]−1 is less than proj_picture_height.
If StereoVideoBox is present and indicates side-by-side frame packing:
 If proj_reg_left[i] is less than proj_picture_width/2 then proj_reg_width[i] and proj_reg_left[i] shall be constrained such that proj_reg_width[i]+proj_reg_left[i]−1 is less than proj_picture_width/2.
 Otherwise (i.e. when proj_reg_left[i] is greater than or equal to proj_picture_width/2) then proj_reg_width[i] and proj_reg_left[i] shall be constrained such that proj_reg_width[i]+proj_reg_left[i]−proj_picture_width/2−1 is less than proj_picture_width/2.
 proj_reg_height[i] and proj_reg_top[i] shall be constrained such that proj_reg_height[i]+proj_reg_top[i]−1 is less than proj_picture_height.
If StereoVideoBox is present and indicates top-bottom frame packing:
 proj_reg_width[i] and proj_reg_left[i] shall be constrained such that proj_reg_width[i]+proj_reg_left[i]−1 is less than proj_picture_width.
 If proj_reg_top[i] is less than proj_picture_height/2 then proj_reg_height[i] and proj_reg_top[i] shall be constrained such that proj_reg_height[i]+proj_reg_top[i]−1 is less than proj_picture_height/2.
 Otherwise (i.e. when proj_reg_top[i] is greater than or equal to proj_picture_height/2) then proj_reg_height[i] and proj_reg_top[i] shall be constrained such that proj_reg_height[i]+proj_reg_top[i]−proj_picture_height/2−1 is less than proj_picture_height/2.

In one example, following constraints may be imposed in the case where constituent_picture_matching_flag is not signaled:
If StereoVideoBox is present and indicates side-by-side frame packing
 If proj_reg_left[i] is less than proj_picture_width/2 then proj_reg_width[i] and proj_reg_left[i] shall be constrained such that proj_reg_width[i]+proj_reg_left[i] is less than proj_picture_width/2.
 Otherwise (i.e. when proj_reg_left[i] is greater than or equal to proj_picture_width/2) then proj_reg_width[i] and proj_reg_left[i] shall be constrained such that proj_reg_width[i]+proj_reg_left[i]−proj_picture_width/2 is less than proj_picture_width/2.
 proj_reg_height[i] and proj_reg_top[i] shall be constrained such that proj_reg_height[i]+proj_reg_top[i] is less than proj_picture_height.
If StereoVideoBox is present and indicates top-bottom frame packing
 proj_reg_width[i] and proj_reg_left[i] shall be constrained such that proj_reg_width[i]+proj_reg_left[i] is less than proj_picture_width.

If proj_reg_top[i] is less than proj_picture_height/2 then proj_reg_height[i] and proj_reg_top[i] shall be constrained such that proj_reg_height[i]+proj_reg_top[i] is less than proj_picture_height/2.

Otherwise (i.e. when proj_reg_top[i] is greater than or equal to proj_picture_height/2) then proj_reg_height[i] and proj_reg_top[i] shall be constrained such that proj_reg_height[i]+proj_reg_top−proj_picture_height/2 is less than proj_picture_height/2.

In one example, the following set of constraints may be imposed:

proj_reg_top[i] and proj_reg_left[i] specify the top sample row and the left-most sample column in the projected picture. The values shall be in the range from 0, inclusive, indicating the top-left corner of the projected picture, to proj_picture_height−1, inclusive, and proj_picture_width−1, inclusive, respectively.

If no StereoVideoBox is present and constituent_picture_matching_regions is equal to 0:
  proj_reg_width[i] and proj_reg_left[i.] shall be constrained such that proj_reg_width[i]+proj_reg_left[i]−1 is less than proj_picture_width.
  proj_reg_height[i] and proj_reg_top[i] shall be constrained such that proj_reg_height[i]+proj_reg_top[i]−1 is less than proj_picture_height.

If StereoVideoBox is present and constituent_picture_matching_regions is equal to 0:
  If proj_reg_left[i] is less than proj_picture_width/HorDiv1 then proj_reg_width[i] and proj_reg_left[i] shall be constrained such that proj_reg_width[i]+proj_reg_left[i]−1 is less than proj_picture_width/HorDiv1.
  Otherwise (i.e. when proj_reg_left[i] is greater than or equal to proj_picture_width/HorDiv1) then proj_reg_width[i] and proj_reg_left[i] shall be constrained such that proj_reg_width[i]+proj_reg_left[i]−proj_picture_width/HorDiv1−1 is less than proj_picture_width/HorDiv1.
  If proj_reg_top[i] is less than proj_picture_height/VerDiv1 then proj_reg_height[i] and proj_reg_top[i] shall be constrained such that proj_reg_height[i]+proj_reg_top[i]−1 is less than proj_picture_height/VerDiv1.
  Otherwise (i.e. when proj_reg_top[i] is greater than or equal to proj_picture_height/VerDiv1) then proj_reg_height[i] and proj_reg_top[i] shall be constrained such that proj_reg_height[i]+proj_reg_top[i]−proj_picture_height/VerDiv1−1 is less than proj_picture_height/VerDiv1.

If constituent_picture_matching_regions is equal to 1:
  proj_reg_width[i] and proj_reg_left[i] shall be constrained such that proj_reg_width[i]+proj_reg_left[i]−1 is less than proj_picture_width/HorDiv1.
  proj_reg_height[i] and proj_reg_top[i] shall be constrained such that proj_reg_height[i]+proj_reg_top[i]−1 is less than proj_picture_height/VerDiv1.

In one example, the following set of constraints may be imposed:

proj_reg_top[i] and proj_reg_left[i] specify the top sample row and the left-most sample column in the projected picture. The values shall be in the range from 0, inclusive, indicating the top-left corner of the projected picture, to proj_picture_height−1, inclusive, and proj_picture_width−1, inclusive, respectively, If no StereoVideoBox is present:
  proj_reg_width[i] and proj_reg_left[i] shall be constrained such that proj_reg_width[i]+proj_reg_left[i]−1 is less than proj_picture_width.
  proj_reg_height[i] and proj_reg_top[i] shall be constrained such that proj_reg_height[i]+proj_reg_top[i]−1 is less than proj_picture_height.

If StereoVideoBox is present:
  proj_reg_width[i] shall be less than or equal to proj_picture_width/HorDiv1.
  If proj_reg_left[i] is less than proj_picture_width/HorDiv1 then proj_reg_width[i] and proj_reg_left[i] shall be constrained such that proj_reg_width[i]+proj_reg_left[i]−1 is less than proj_picture_width/HorDiv1.
  Otherwise (i.e. when proj_reg_left[i] is greater than or equal to proj_picture_width/HorDiv1) then proj_reg_width[i] and proj_reg_left[i] shall be constrained such that proj_reg_width[i]+proj_reg_left[i]−proj_picture_width/HorDiv1−1 is less than proj_picture_width/HorDiv1.
  proj_reg_height[i] shall be less than or equal to proj_picture_height/VerDiv1.
  If proj_reg_top[i] is less than proj_picture_height/VerDiv1 then proj_reg_height[i] and proj_reg_top[i] shall be constrained such that proj_reg_height[i]+proj_reg_top[i]−1 is less than proj_picture_height/VerDiv1.
  Otherwise (i.e. when proj_reg_top[i] is greater than or equal to proj_picture_height/VerDiv1) then proj_reg_height[i] and proj_reg_top[i] shall be constrained such that proj_reg_height[i]+proj_reg_top[i]−proj_picture_height/VerDiv1−1 is less than proj_picture_height/VerDiv1.

In this manner, data encapsulator 107 represents an example of a device configured to signal information associated with region-wise packing.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I$^2$C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I$^2$C, or any other logical and physical structure that may be used to interconnect peer devices. Data decapsulator 123 may be configured to receive a bitstream and metadata generated by data encaspulator 107 and perform a reciprocal decapsulation process.

Video decoder 124 may include any device configured to receive a bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. Display 126 may include a stereoscopic display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein. Destination device 120 may include a receiver device.

Figure 7:
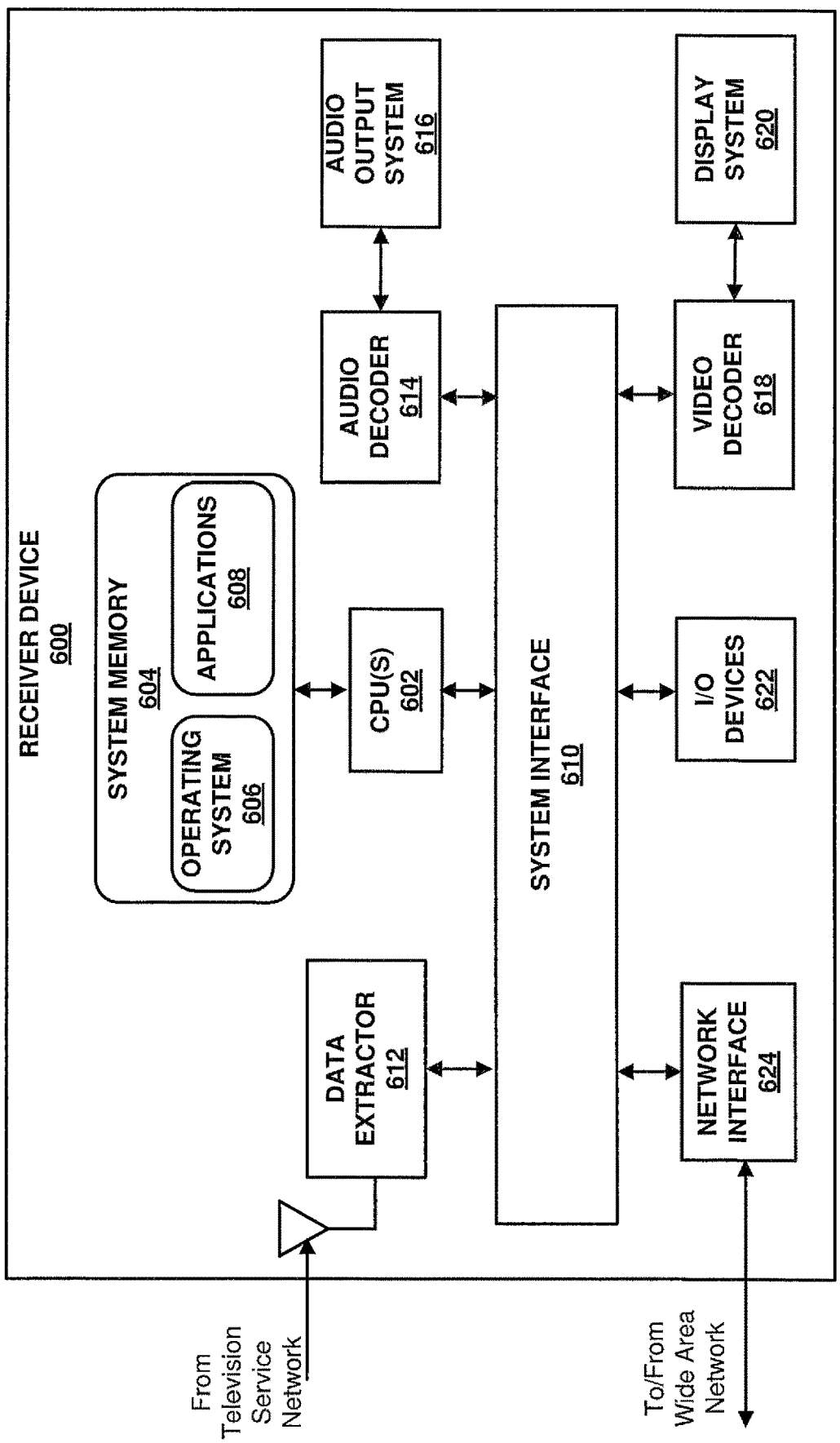
FIG. 7 is a block diagram illustrating an example of a receiver device that may implement one or more techniques of this disclosure.

FIG. 7 is a block diagram illustrating an example of a receiver device that may implement one or more techniques of this disclosure. That is, receiver device 600 may be configured to parse a signal based on the semantics described above and/or perform mapping of mapping sample locations in a packed frame to angular coordinates of a projection structure. Receiver device 600 is an example of a computing device that may be configured to receive data from a communications network and allow a user to access multimedia content, including a virtual reality application. In the example illustrated in FIG. 7, receiver device 600 is configured to receive data via a television network, such as, for example, television service network 404 described above. Further, in the example illustrated in FIG. 7, receiver device 600 is configured to send and receive data via a wide area network. It should be noted that in other examples, receiver device 600 may be configured to simply receive data through a television service network 404. The techniques described herein may be utilized by devices configured to communicate using any and all combinations of communications networks.

As illustrated in FIG. 7, receiver device 600 includes central processing unit(s) 602, system memory 604, system interface 610, data extractor 612, audio decoder 614, audio output system 616, video decoder 618, display system 620, I/O device(s) 622, and network interface 624. As illustrated in FIG. 7, system memory 604 includes operating system 606 and applications 608. Each of central processing unit(s) 602, system memory 604, system interface 610, data extractor 612, audio decoder 614, audio output system 616, video decoder 618, display system 620, I/O device(s) 622, and network interface 624 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 600 is illustrated as having distinct functional blocks, such an illustration is for descriptive purposes and does not limit receiver device 600 to a particular hardware architecture. Functions of receiver device 600 may be realized using any combination of hardware, firmware and/or software implementations.

CPU(s) 602 may be configured to implement functionality and/or process instructions for execution in receiver device 600. CPU(s) 602 may include single and/or multi-core central processing units. CPU(s) 602 may be capable of retrieving and processing instructions, code, and/or data structures for implementing one or more of the techniques described herein. Instructions may be stored on a computer readable medium, such as system memory 604.

System memory 604 may be described as a non-transitory or tangible computer-readable storage medium. In some examples, system memory 604 may provide temporary and/or long-term storage. In some examples, system memory 604 or portions thereof may be described as non-volatile memory and in other examples portions of system memory 604 may be described as volatile memory. System memory 604 may be configured to store information that may be used by receiver device 600 during operation. System memory 604 may be used to store program instructions for execution by CPU(s) 602 and may be used by programs running on receiver device 600 to temporarily store information during program execution. Further, in the example where receiver device 600 is included as part of a digital video recorder, system memory 604 may be configured to store numerous video files.

Applications 608 may include applications implemented within or executed by receiver device 600 and may be implemented or contained within, operable by, executed by, and/or be operatively/communicatively coupled to components of receiver device 600. Applications 608 may include instructions that may cause CPU(s) 602 of receiver device 600 to perform particular functions. Applications 608 may include algorithms which are expressed in computer programming statements, such as, for-loops, while-loops, if-statements, do-loops, etc. Applications 608 may be developed using a specified programming language. Examples of programming languages include, Java™, Jini™, C, C++, Objective C, Swift, Perl, Python, PhP, UNIX Shell, Visual Basic, and Visual Basic Script. In the example where receiver device 600 includes a smart television, applications may be developed by a television manufacturer or a broadcaster. As illustrated in FIG. 7, applications 608 may execute in conjunction with operating system 606. That is, operating system 606 may be configured to facilitate the interaction of applications 608 with CPUs(s) 602, and other hardware components of receiver device 600. Operating system 606 may be an operating system designed to be installed on set-top boxes, digital video recorders, televisions, and the like. It should be noted that techniques described herein may be utilized by devices configured to operate using any and all combinations of software architectures.

System interface 610 may be configured to enable communications between components of receiver device 600. In one example, system interface 610 comprises structures that enable data to be transferred from one peer device to another peer device or to a storage medium. For example, system interface 610 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices (e.g., proprietary bus protocols).

As described above, receiver device 600 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 7, data extractor 612 may be configured to extract video, audio, and data from a signal. A signal may be defined according to, for example, aspects DVB standards, ATSC standards, ISDB standards, DTMB standards, DMB standards, and DOCSIS standards.

Data extractor 612 may be configured to extract video, audio, and data, from a signal. That is, data extractor 612 may operate in a reciprocal manner to a service distribution engine. Further, data extractor 612 may be configured to parse link layer packets based on any combination of one or more of the structures described above.

Data packets may be processed by CPU(s) 602, audio decoder 614, and video decoder 618. Audio decoder 614 may be configured to receive and process audio packets. For example, audio decoder 614 may include a combination of hardware and software configured to implement aspects of an audio codec. That is, audio decoder 614 may be configured to receive audio packets and provide audio data to audio output system 616 for rendering. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3) formats. Audio output system 616 may be configured to render audio data. For example, audio output system 616 may include an audio processor, a digital-to-analog converter, an amplifier, and a speaker system. A speaker system may include any of a variety of speaker systems, such as headphones, an integrated stereo speaker system, a multi-speaker system, or a surround sound system.

Video decoder 618 may be configured to receive and process video packets. For example, video decoder 618 may include a combination of hardware and software used to implement aspects of a video codec. In one example, video decoder 618 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 Advanced video Coding (AVC)), and High-Efficiency Video Coding (HEVC). Display system 620 may be configured to retrieve and process video data for display. For example, display system 620 may receive pixel data from video decoder 618 and output data for visual presentation. Further, display system 620 may be configured to output graphics in conjunction with video data, e.g., graphical user interfaces. Display system 620 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 622 may be configured to receive input and provide output during operation of receiver device 600. That is, I/O device(s) 622 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 622 may be operatively coupled to receiver device 600 using a standardized communication protocol, such as for example, Universal Serial Bus protocol (USB), Bluetooth, ZigBee or a proprietary communications protocol, such as, for example, a proprietary infrared communications protocol.

Network interface 624 may be configured to enable receiver device 600 to send and receive data via a local area network and/or a wide area network. Network interface 624 may include a network interface card, such as an Ethernet card, an optical transceiver, a radio frequency transceiver, or any other type of device configured to send and receive information. Network interface 624 may be configured to perform physical signaling, addressing, and channel access control according to the physical and Media Access Control (MAC) layers utilized in a network. Receiver device 600 may be configured to parse a signal generated according to any of the techniques described above. In this manner, receiver device 600 represents an example of a device configured parse one or more syntax elements including information associated with a virtual reality application In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method of signaling information associated with projected regions and packed regions of a stereoscopic picture, the method comprising:
    signaling a region-wise packing structure;
    signaling a value for a constituent picture matching flag, in the region-wise packing structure, indicating whether information of the projected regions and the packed regions in the region-wise packing structure applies individually to each constituent picture;
    signaling a number of regions syntax element in the region-wise packing structure;
    signaling a total number of the packed regions based on the parsed value of the constituent picture matching flag and the parsed number of regions syntax element; and
    applying information in a rectangular region packing to each constituent picture of the projected regions and the packed regions.

2. A method of determining information associated with projected regions and packed regions of a stereoscopic picture, the method comprising:
    receiving a region-wise packing structure; and
    parsing a constituent picture matching flag, in the region-wise packing structure, having a value indicating whether information of the projected regions and the packed regions in the region-wise packing structure applies individually to each constituent picture;
    parsing a number of regions syntax element in the region-wise packing structure;
    determining a total number of the packed regions based on the parsed value of the constituent picture matching flag and the parsed number of regions syntax element; and
    applying information in a rectangular region packing to each constituent picture of the projected regions and the packed regions.

* * * * *